United States Patent
Ito et al.

(10) Patent No.: US 7,582,995 B2
(45) Date of Patent: Sep. 1, 2009

(54) STEPPING MOTOR, LENS DEVICE USING THE SAME, AND IMAGING DEVICE USING THE SAME

(75) Inventors: Yoshihiro Ito, Saitama (JP); Yoji Naka, Saitama (JP); Takehiko Senba, Saitama (JP); Haruo Onozuka, Saitama (JP); Mitsuo Manabe, Saitama (JP)

(73) Assignees: Fujinon Corporation, Saitama (JP); FUJIFILM Corporation, Tokyo (JP)

( * ) Notice: Subject to any disclaimer, the term of this patent is extended or adjusted under 35 U.S.C. 154(b) by 498 days.

(21) Appl. No.: 11/231,905

(22) Filed: Sep. 22, 2005

(65) Prior Publication Data

US 2006/0115259 A1 Jun. 1, 2006

(30) Foreign Application Priority Data

| Sep. 22, 2004 | (JP) | .............................. 2004-275780 |
| Sep. 22, 2004 | (JP) | .............................. 2004-275782 |
| Feb. 25, 2005 | (JP) | .............................. 2005-051504 |

(51) Int. Cl.
*H02K 7/06* (2006.01)
*H02K 37/12* (2006.01)
*H02K 7/20* (2006.01)
*H02K 16/00* (2006.01)

(52) U.S. Cl. .................... 310/80; 310/20; 310/49 R; 310/112; 310/114

(58) Field of Classification Search .............. 310/49 R, 310/80, 20, 112, 114
See application file for complete search history.

(56) References Cited

U.S. PATENT DOCUMENTS

| 2,797,346 | A | * | 6/1957 | Ranseen ........................ 310/46 |
| 3,293,460 | A | * | 12/1966 | Iwai et al. ................. 310/49 R |
| 3,437,854 | A | * | 4/1969 | Oiso ......................... 310/49 R |
| 3,549,918 | A | * | 12/1970 | van Hout .................. 310/49 R |
| 4,009,406 | A | * | 2/1977 | Inariba ....................... 310/164 |
| 4,596,449 | A |   | 6/1986 | Iwata et al. |
| 4,605,286 | A |   | 8/1986 | Sumi |
| 4,639,084 | A | * | 1/1987 | Kugioka ..................... 359/824 |
| 4,676,605 | A | * | 6/1987 | Toda et al. ................. 359/696 |
| 4,879,484 | A | * | 11/1989 | Huss .......................... 310/114 |
| 5,260,642 | A | * | 11/1993 | Huss .......................... 322/51 |

(Continued)

FOREIGN PATENT DOCUMENTS

JP    56-147132 A    11/1981

(Continued)

*Primary Examiner*—Quyen Leung
*Assistant Examiner*—Alex W Mok
(74) *Attorney, Agent, or Firm*—Sughrue Mion, PLLC

(57) ABSTRACT

A stepping motor comprises first to third coil portions and first to second rotors. The first rotor has a cylindrical shape and a circumferential surface thereof is magnetically-polarized so as to alternately arrange south poles and north poles. The first rotor is disposed inside the first and second coil portions, and is rotated by magnetic fields generated at a time when the first and second coil portions are energized. The second rotor has a disk shape and a surface thereof is magnetically polarized so as to alternately arrange south poles and north poles. The second rotor is disposed such that edge areas of both surfaces thereof are interposed between the second and third coil portions. The second rotor is rotated by magnetic fields generated at a time when the second and third coil portions are energized.

24 Claims, 17 Drawing Sheets

U.S. PATENT DOCUMENTS

| | | | |
|---|---|---|---|
| 5,451,824 A * | 9/1995 | Sieber et al. | 310/80 |
| 6,157,103 A * | 12/2000 | Ohta et al. | 310/49 R |
| 6,211,591 B1 * | 4/2001 | Kowalski et al. | 310/80 |
| 6,744,156 B2 * | 6/2004 | Doi | 310/49 R |
| 6,771,000 B2 * | 8/2004 | Kim et al. | 310/209 |
| 6,800,970 B2 | 10/2004 | Aoshima | |
| 2002/0047313 A1 * | 4/2002 | Aoshima | 310/10 |
| 2002/0167603 A1 * | 11/2002 | Kato et al. | 348/341 |
| 2008/0036322 A1 * | 2/2008 | Franke | 310/114 |

FOREIGN PATENT DOCUMENTS

| | | |
|---|---|---|
| JP | 59-109007 A | 6/1984 |
| JP | 62-195615 A | 8/1987 |

* cited by examiner

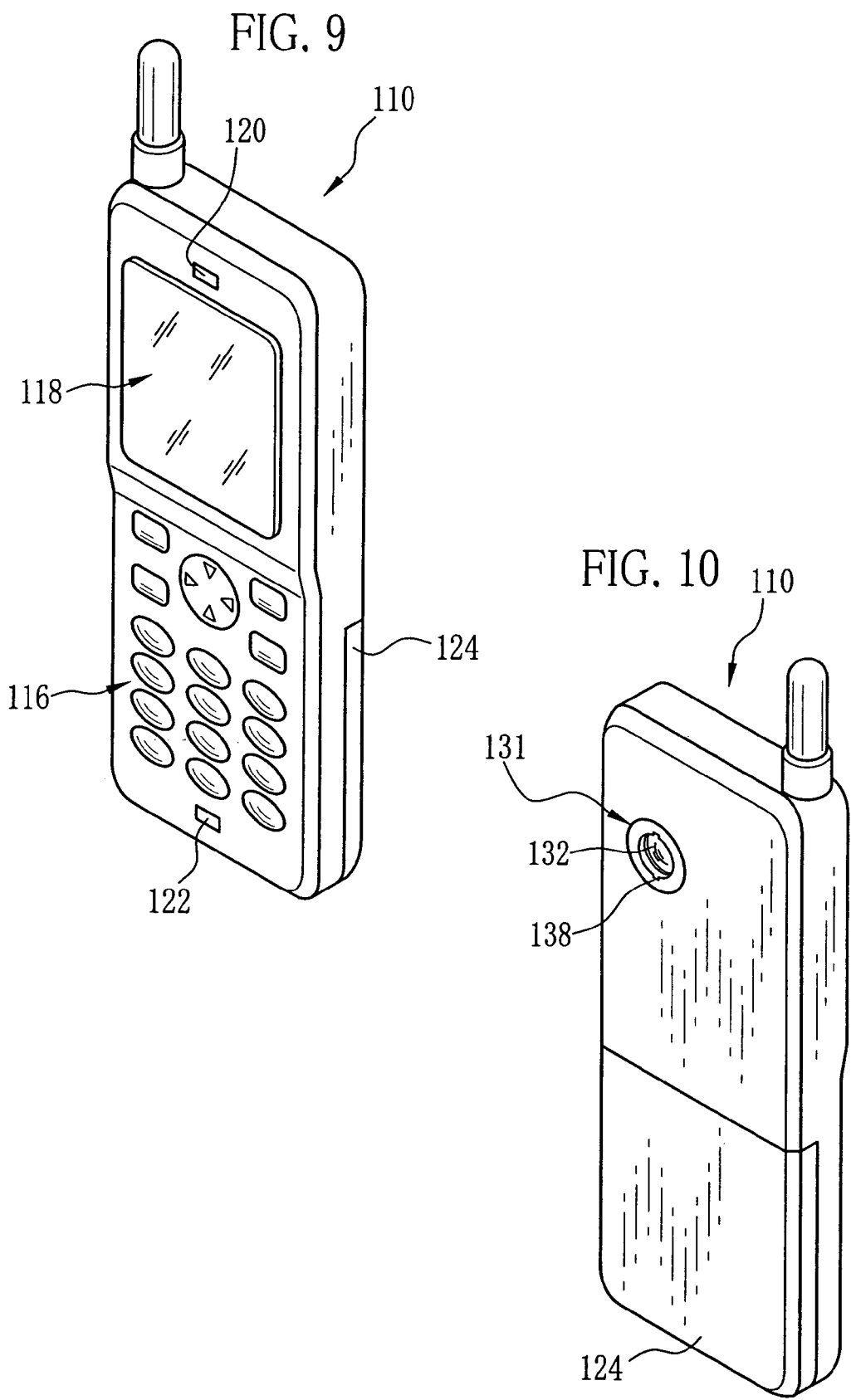

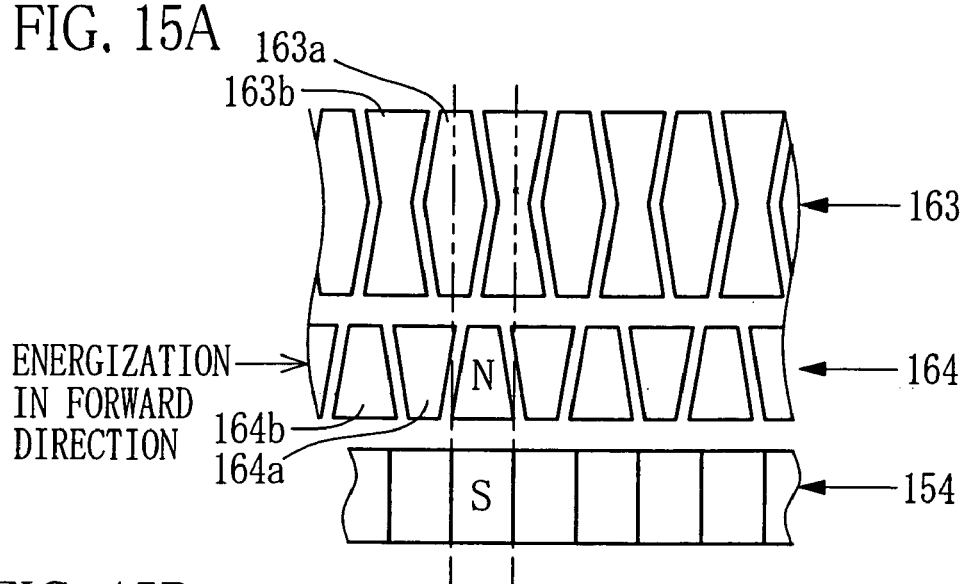
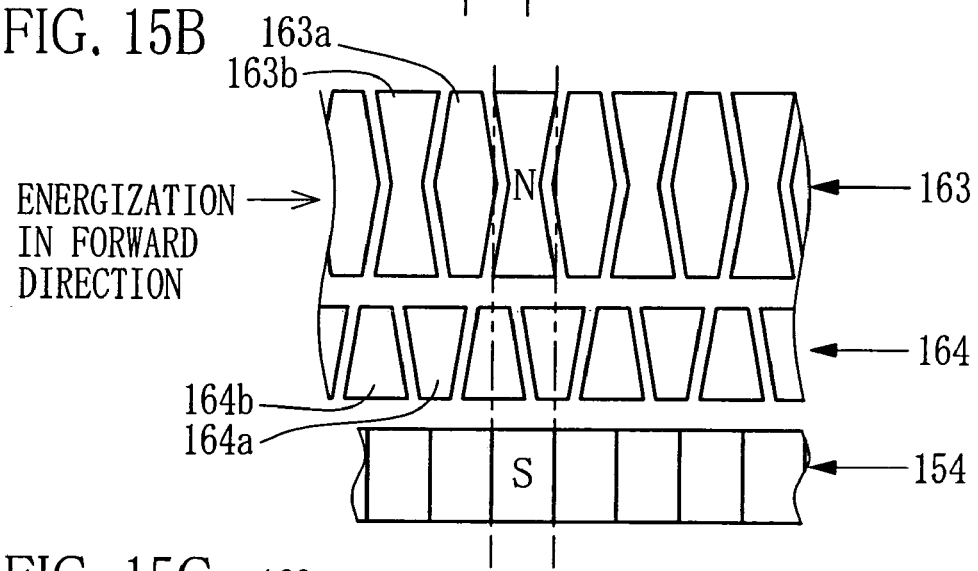
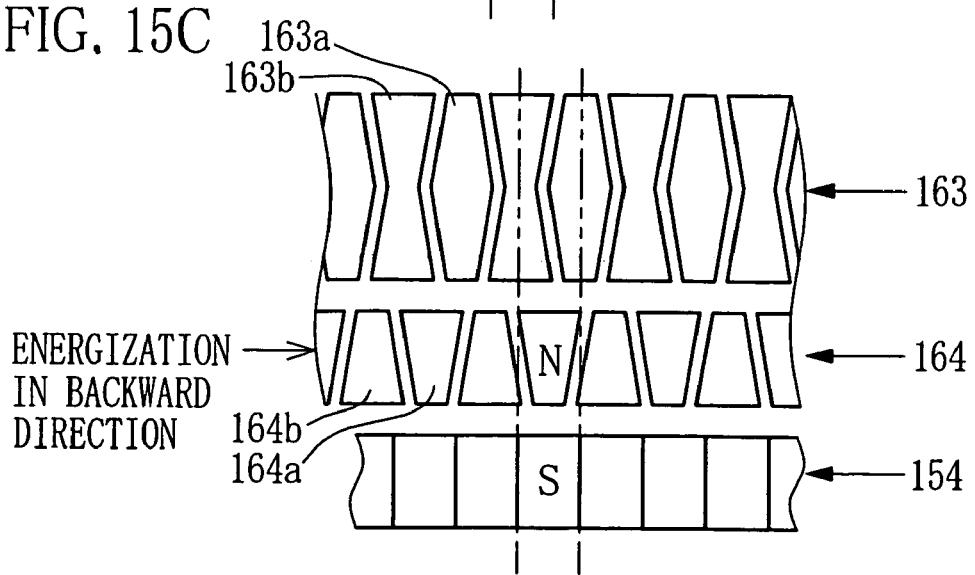

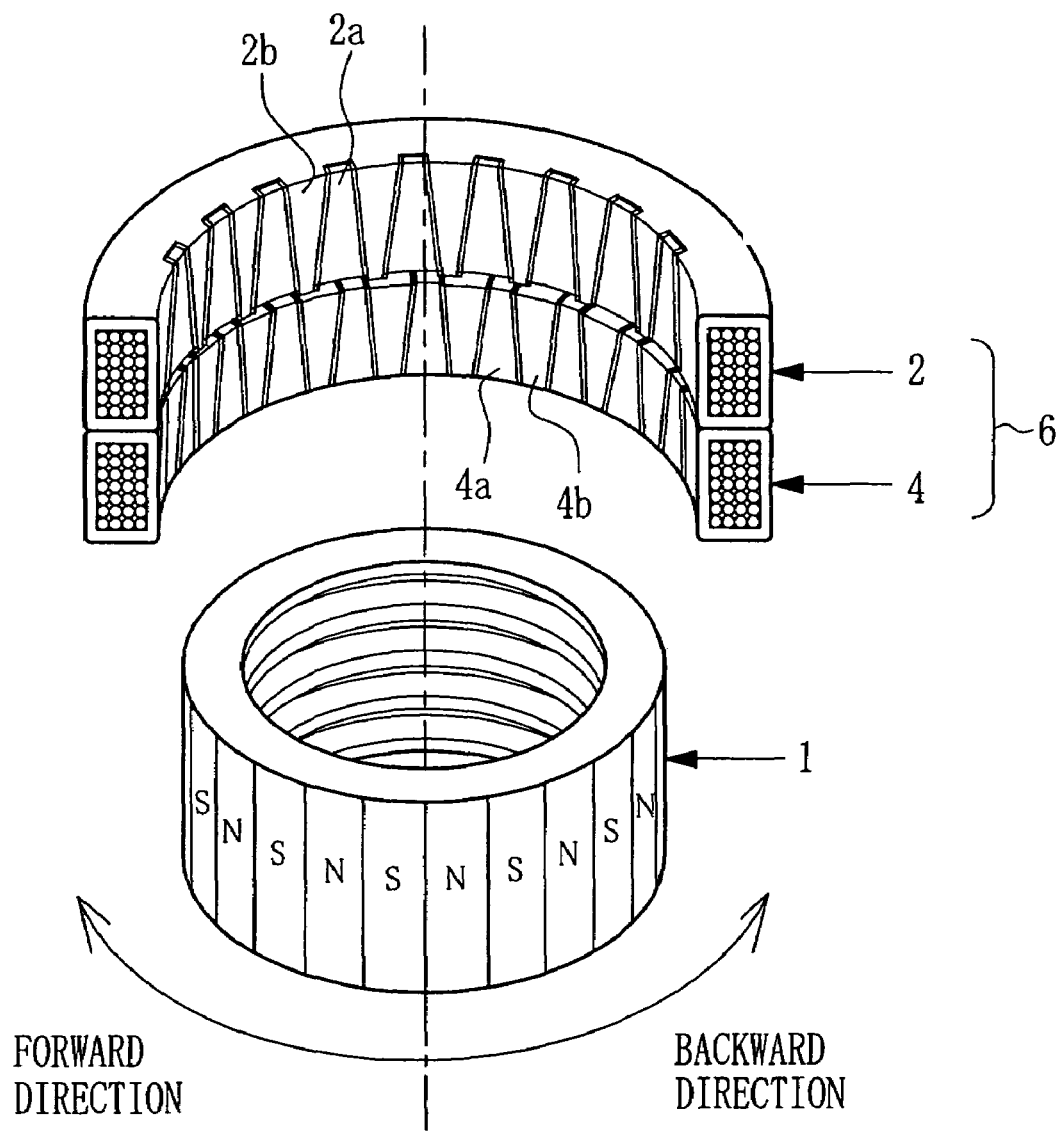

ENERGIZATION IN FORWARD DIRECTION

ENERGIZATION IN FORWARD DIRECTION

ENERGIZATION IN BACKWARD DIRECTION

ENERGIZATION IN BACKWARD DIRECTION

STEPPING MOTOR, LENS DEVICE USING THE SAME, AND IMAGING DEVICE USING THE SAME

BACKGROUND OF THE INVENTION

Field of the Invention

The present invention relates to a hollow stepping motor in which a hollow rotor is rotated by magnetic fields generated in a fixed barrel, and further relates to a lens device and an imaging device using this stepping motor.

Description of the Related Art

In recent years, an imaging device (electronic camera) utilizing a solid-state image sensor is incorporated in a small-sized terminal equipment of a cell-phone, a PDA and so forth. The solid-state image sensor is, for example, a CCD image sensor and a CMOS image sensor. The electronic camera converts a subject image, which is optically obtained through a taking lens, into an image signal by the solid-state image sensor to electronically capture and record the image. Shooting functions of the electronic camera have been improved as the solid-state image sensor is downsized and as pixel density thereof increases.

For instance, Japanese Patent Laid-Open Publication No. 59-109007 discloses a device in which a taking lens is moved to perform focus adjustment. This device comprises a movable barrel containing the taking lens, and a rotary barrel engaging with the movable barrel via a cam mechanism. By rotating the rotary barrel, the movable barrel is driven in an axial direction to move the taking lens. The device further comprises a fixed barrel surrounding the rotary barrel. The fixed barrel and the rotary barrel constitute a hollow stepping motor of a claw-pole type so that space efficiency is improved.

This kind of the hollow claw-pole-type stepping motor is constituted of a rotary barrel (rotor) 1 and a fixed barrel (stator) 6 such as shown in FIG. 18, for example. The rotary barrel 1 comprises permanent magnets of north pole and south pole, which are alternately arranged on its circumference. The fixed barrel 6 comprises first and second coil portions 2 and 4 respectively having a built-in coil.

As to the first coil portion 2, the coil is contained in a yoke made of a magnetic material of iron and so forth. The yoke has a gap formed in a rectangular-wave shape. In virtue of the gap, teeth 2a and 2b meshing with each other are formed at an inner surface of the first coil portion 2.

When a current flows in the first coil portion 2 in a forward direction (clockwise direction in the drawing), concentric lines of magnetic force are generated around the current (so-called right-handed screw rule). The generated line of magnetic force passes through the inside of the yoke made of the magnetic material, and is discharged into the air after reaching the tooth 2b. The discharged line of the magnetic force passes through the gap, and enters the yoke again from the tooth 2a. Thus, magnetic fields of south pole and north pole occur at the teeth 2a and 2b respectively. In contrast, when the current flows in the first coil portion 2 in a backward direction (counterclockwise direction in the drawing), the line of magnetic force is reversed. Thus, the magnetic fields of north pole and south pole occur at the teeth 2a and 2b respectively.

Similarly, teeth 4a and 4b are formed at an inner surface of the second coil portion 4. When the current flows in the second coil portion 4 in the forward direction, the teeth 4a is magnetized in south pole and the tooth 4b is magnetized in north pole. When the current flows in the backward direction, the tooth 4a is magnetized in north pole and the tooth 4b is magnetized in south pole. Incidentally, the first and second coil portions 2 and 4 are disposed in a state that the teeth 4a and 4b of the second coil portion 4 are positioned so as to be shifted relative to the tooth 2a and 2b of the first coil portion 2 by a half of the teeth.

For rotating the rotor 1 in the forward direction, it is performed first to let the current flow in the first coil portion 2 in the forward direction, such as shown in FIG. 19A. When the current flows in the first coil portion 2 in the forward direction, the teeth 2a is magnetized in south pole and the tooth 2b is magnetized in north pole to respectively attract the counterpart of the magnetic poles of the rotor 1. Successively, it is performed to let the current flow in the second coil portion 4 in the forward direction, such as shown in FIG. 19B. Since the teeth 4a and 4b of the second coil portion 4 are positioned so as to be shifted relative to the teeth 2a and 2b of the first coil portion 2 by the half of the tooth, the rotor 1 is attracted by each of the magnetically-polarized teeth 4a and 4b of the second coil portion 4 to rotate in the forward direction by an angle corresponding the half of the tooth.

Successively, it is performed in a similar way to let the current flow in the first coil portion 2 in the backward direction, such as shown in FIG. 19C. And then, it is performed to let the current flow in the second coil portion 4 in the backward direction, such as shown in FIG. 19D. After that, the operation shown in FIG. 19A is performed again. By repeating this sequence, the rotor 1 is rotated in the forward direction. In the meantime, for rotating the rotor 1 in the backward direction, it is performed first to let the current flow in the first coil portion 2 in the forward direction. Successively, it is performed to let the current flow in the order of the backward direction of the second coil portion 4, the backward direction of the first coil portion 2 and the forward direction of the second coil portion 4. By repeating this sequence, the rotor 1 is rotated in the backward direction.

However, the conventional hollow stepping motor of the claw-pole type uses two coil portions to rotate a single rotor. In case that a plurality of rotors are rotated, a number of the coil portions increases. Thus, there arises a problem in that a size of the device becomes larger.

SUMMARY OF THE INVENTION

In view of the foregoing, it is a primary object of the present invention to provide a stepping motor, a lens device and an imaging device in which sizes thereof are prevented from enlarging.

In order to achieve the above and other objects, the stepping motor according to the present invention comprises hollow rotors and a fixed barrel. The rotors are coaxially disposed and have magnetic substances, which are arranged so as to alternately place opposite polarities in a circumferential direction. The fixed barrel includes coil portions alternately generating magnetic fields, which have opposite polarities, in a circumferential direction in accordance with a current flowing therein. The adjacent coil portions become a pair to rotate the respective rotors. The rotors and the coil portions are coaxially disposed. The fixed barrel uses the coil portion, which is interposed between the two coil portions, so as to cooperate with the adjacent coil portions to rotate two rotors.

In a preferred embodiment, the rotor is formed in a cylindrical shape and is disposed inside the coil portions. This rotor is placed at an intermediate position of the adjacent two coil portions and is rotated by the magnetic fields, which are generated by the adjacent two coil portions at the inside thereof.

In another embodiment, the rotor is formed in a hollow-disk shape and is disposed so as to be interposed between the adjacent two coil portions. This rotor is rotated by the magnetic fields, which are generated by the adjacent two coil portions at lateral sides thereof in its axial direction.

In the other embodiment, the rotors include the cylindrical rotor and the hollow disk-shaped rotor. The cylindrical rotor is placed inside the adjacent two coil portions at an intermediate position thereof. The cylindrical rotor is rotated by the magnetic fields, which are generated by the adjacent two coil portions at the inside thereof. The hollow disk-shaped rotor is disposed so as to be interposed between the adjacent two coil portions, and is rotated by the magnetic fields generated by the adjacent two coil portions at lateral sides thereof in its axial direction.

The lens device according to the present invention utilizes the above-mentioned stepping motor to drive at least one of a movable lens and a light-amount variable member by rotation of the rotor.

The movable lens is held by a movable barrel disposed at the inside of at least one rotor. An inner surface of the rotor is connected to an outer surface of the movable barrel via a helicoid mechanism. The movable barrel is moved in its axial direction upon rotation of the rotor to drive the movable lens.

The light-amount variable member comprises a driving member and is disposed at the inside of at least one rotor. The driving member is rotated to change a size of an aperture, which opens an optical path of the movable lens. An inner surface of the rotor is connected to the driving member. Upon rotation of this rotor, the driving member is rotated to drive the light-amount variable member.

An imaging device may be constituted by the above-mentioned lens device and a solid-state image sensor disposed behind the lens device. Further, an optical device may be constituted by using the above-mentioned lens device.

According to the stepping motor of the present invention, the coil portion interposed between two coil portions is used so as to cooperate with the adjacent coil portions to rotate two rotors. Thus, it is possible to rotate a plurality of the rotors by the coil portions whose number is greater than the number of the rotors by one. Consequently, it is possible to reduce its size in comparison with a case in that two coil portions rotate a single rotor.

Moreover, the above stepping motor is used for driving the movable lens of a focus lens, a zoom lens and so forth, and is further used for driving the light-amount variable device of a shutter, a stop and so forth. Thus, it is possible to downsize the lens device. Furthermore, by using this kind of the lens device, it is also possible to downsize the imaging device of a camera, etc. and the optical device of a projector, etc.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 9 is a front perspective view of a camera-equipped cell-phone;

FIG. 10 is a rear perspective view of the camera-equipped cell-phone;

FIGS. 15A to 15C are explanatory illustrations showing a sequence for rotating the second rotor in the forward direction;

FIG. 18 is an explanatory illustration of a conventional hollow stepping motor.

DETAILED DESCRIPTION OF THE PREFERRED EMBODIMENT(S)

Figure 1:
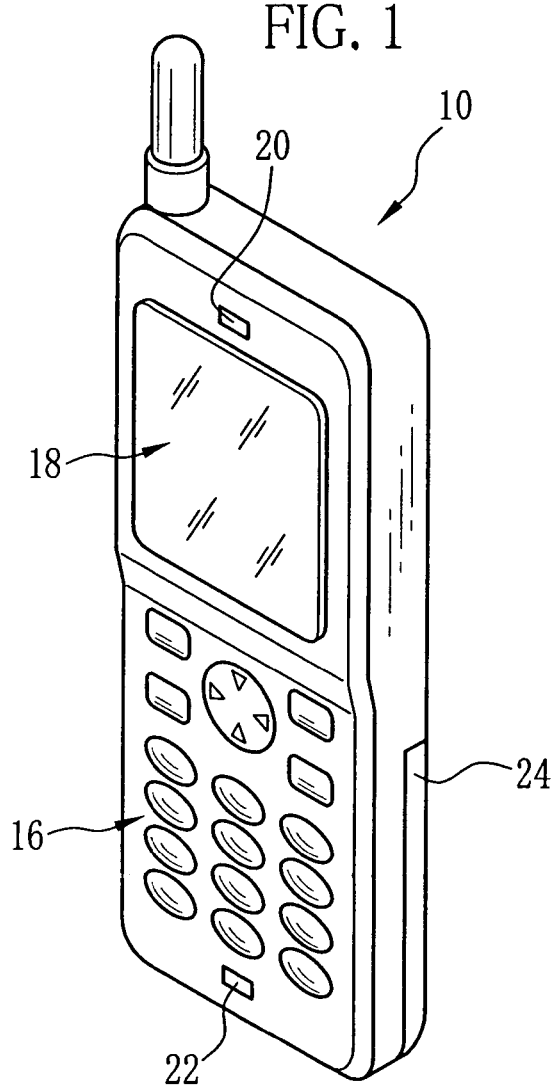
FIG. 1 is a front perspective view of a camera-equipped cell-phone.
Figure 2:
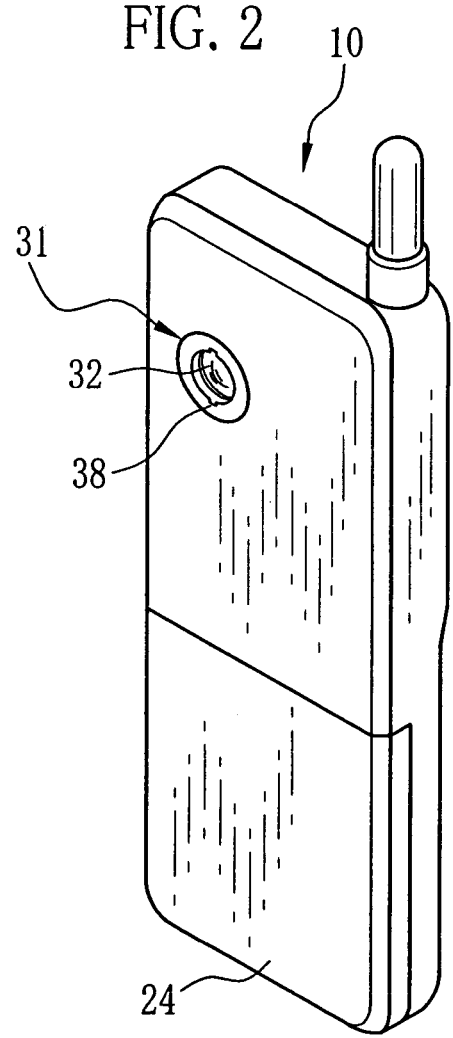
FIG. 2 is a rear perspective view of the camera-equipped cell phone.

With respect to the first embodiment of the present invention, a camera-equipped cell-phone loaded with a lens device is described below. In FIG. 1, the front of the camera-equipped cell-phone 10 is provided with an operating portion 16 for performing various operations, and a liquid-crystal display panel (LCD) 18 for displaying various images. Moreover, a speaker 20 and a microphone 22 to be used at a time of a phone call are also provided. In FIG. 2, the rear of the camera-equipped cell-phone 10 is provided with a battery 24 for supplying an electric power. The battery 24 is detachably attached. In addition, a lens device 31 constituting an electronic camera 30 (see FIG. 8) is also provided. A taking lens 32 incorporated in the lens device 31 is exposed at the rear of the camera-equipped cell-phone 10.

The camera-equipped cell-phone 10 has a phone-call mode for making a call by using the speaker 20 and the microphone 22, and a camera mode for capturing a subject light, which is obtained through the taking lens 32, in an embedded memory 34 (see FIG. 8) as digital image data. The respective modes are switched by handling the operating portion 16. Further, by handling the operating portion 16, it is possible to input telephone numbers under the phone-call mode and to perform various operations of shutter release and so forth under the camera mode. The LCD 18 shows the images, which are stored in the embedded memory 34, and various information pictures of a menu picture and so forth. Additionally, the LCD 18 shows a so-called through image under the camera mode for the purpose of framing.

Figure 3:
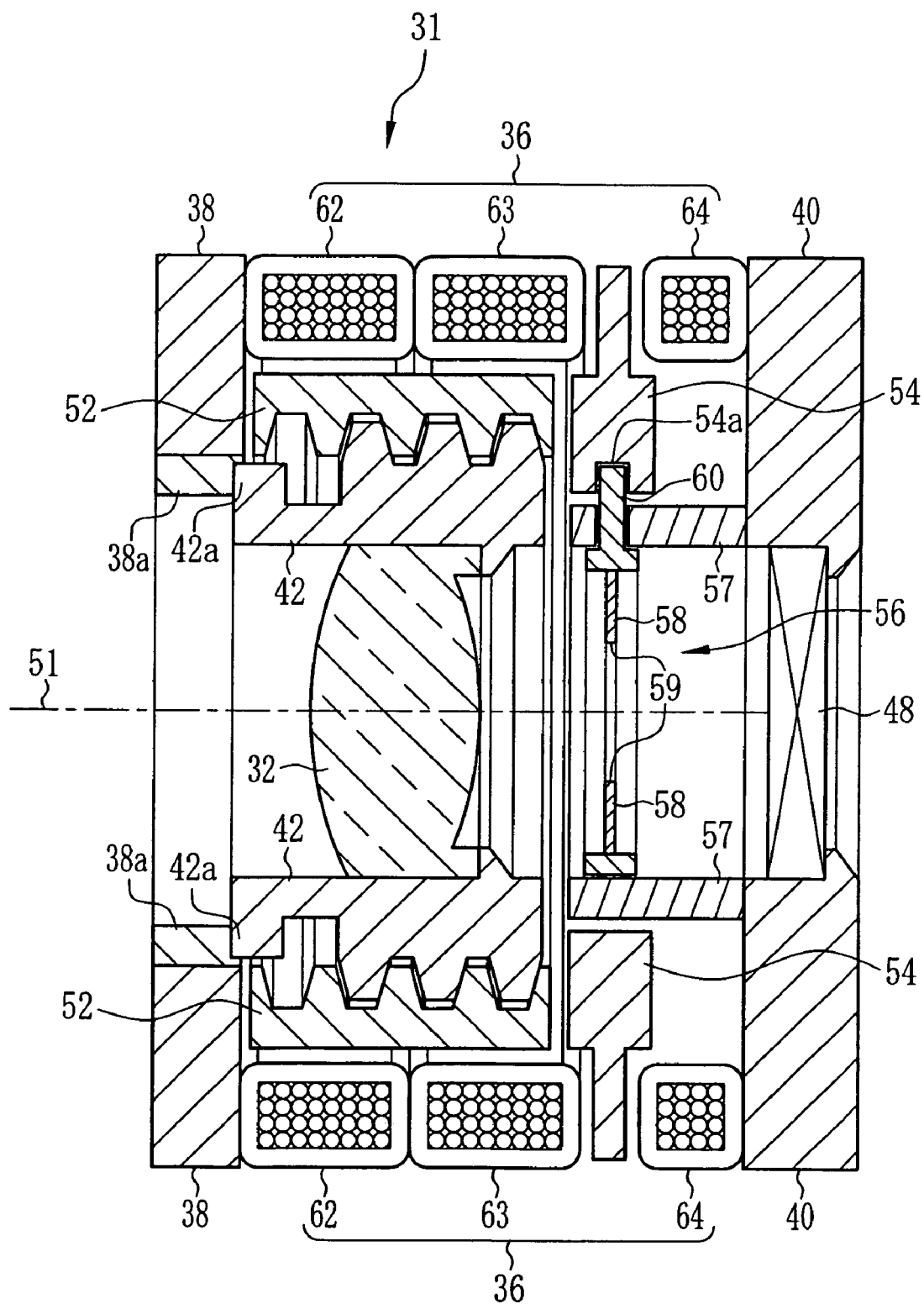
FIG. 3 is a section view of a lens device.

As shown in FIG. 3, the lens device 31 comprises a front cover 38 and a rear cover 40 so as to interpose a fixed barrel 36 between them. The taking lens 32 is exposed through an opening of the front cover 38. The taking lens 32 is contained in a movable barrel 42 and refracts the subject light entering along an optical axis 51 to form an image on a light-receiving surface of a CCD 48 built in the rear cover 40.

Figure 4:
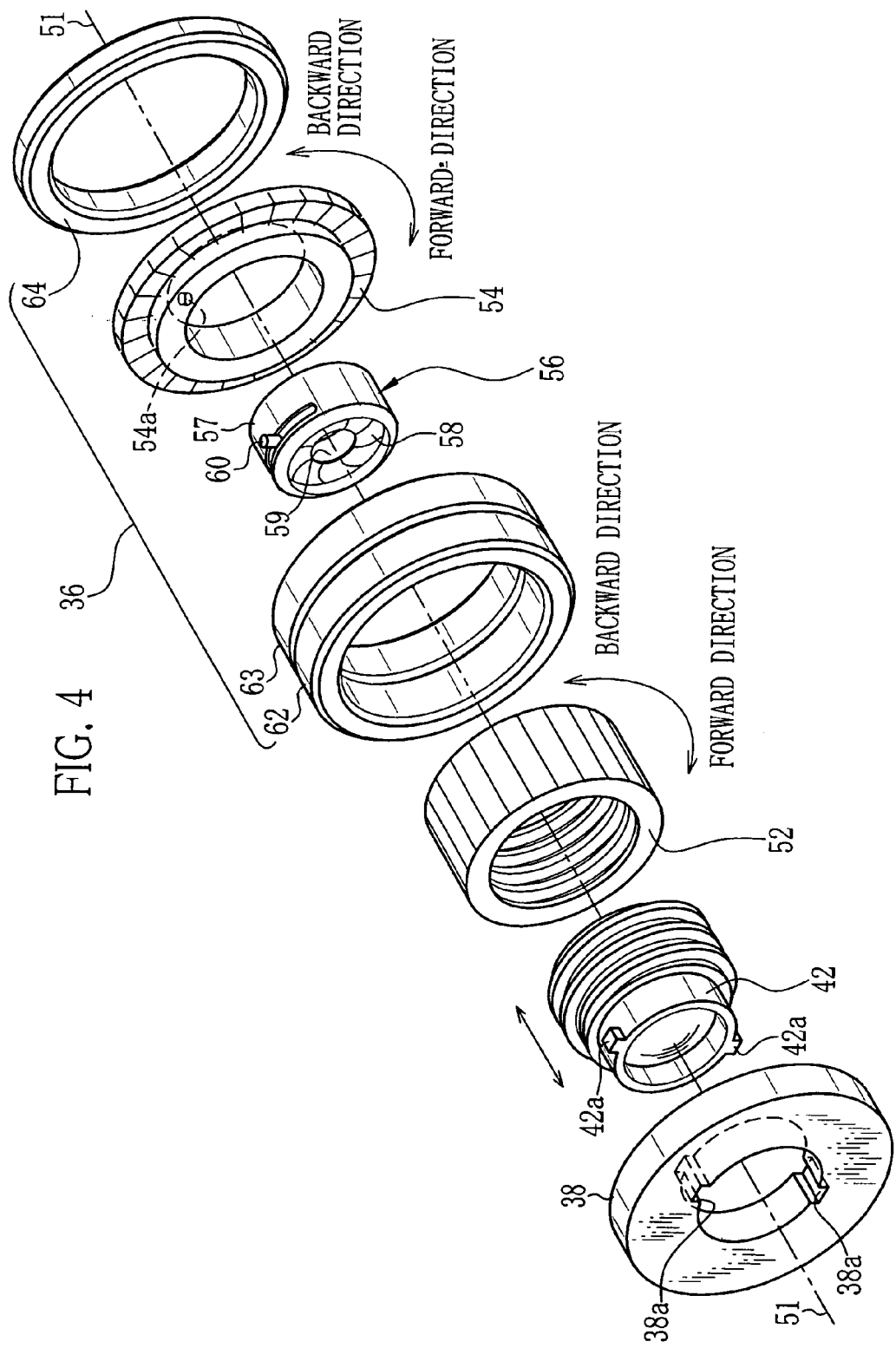
FIG. 4 is an exploded perspective view of the lens device.

As shown in FIG. 4, the movable barrel 42 is provided with protrusions 42a, and the opening of the front cover 38 is provided with guide grooves 38a for engaging with the protrusions 42a. The protrusion 42a engages with the guide groove 38a so that the movable barrel 42 is slidably supported in a direction of the optical axis 51. A cylindrical first rotor 52 is disposed at the periphery of the movable barrel 42, which is connected to the first rotor 52 via a helicoid mechanism. When the first rotor 52 rotates in a forward direction (clockwise direction in the drawing), the movable barrel 42 is moved toward the front cover 38 so as to be pushed, since the protrusion 42a and the guide groove 38a prevent the movable barrel 42 from rotating. In contrast, when the first rotor 52 rotates in a backward direction (counterclockwise direction in the drawing), the movable barrel 42 is moved toward the rear cover 40. In virtue of the rotation of the first rotor 52, the taking lens 32 is moved in the direction of the optical axis 51 together with the movable barrel 42 to perform focus adjustment.

A second rotor 54 and an aperture mechanism 56 of a rotary drive type are disposed behind the movable barrel 42. The aperture mechanism 56 is retained by attaching a rear end of a cylindrical case 57 to the rear cover 40. The case 57 contains a plurality of aperture blades 58 radially arranged around the optical axis 51 to form an aperture 59. A drive lever 60 projects from the case 57 so as to be movable in a circumferential direction of the case 57. The drive lever 60 is connected to the respective aperture blades 58 via a cam mechanism. Upon movement of the drive lever 60, the respective aperture blades 58 are moved to change a diameter of the aperture 59. The second rotor 54 has a hollow-disk shape and is disposed so as to surround the aperture mechanism 56. An engagement hole 54a is formed in an inner surface of the second rotor 54 to engage with the drive lever 60 of the aperture mechanism 56. Upon rotation of the second rotor 54, the drive lever 60 is revolved to change the diameter of the aperture 59, so that aperture adjustment is performed.

Figure 5:
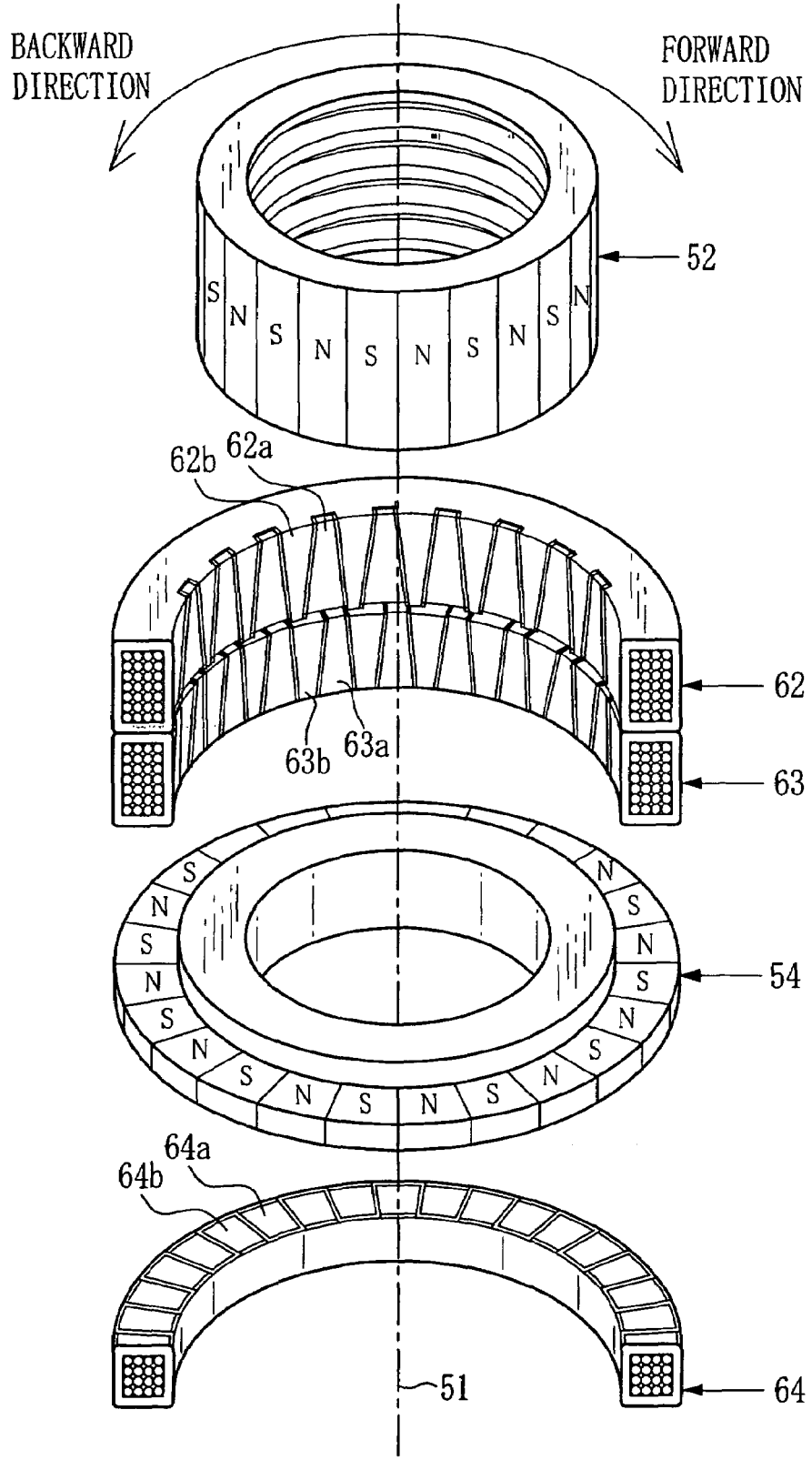
FIG. 5 is an explanatory illustration of a hollow stepping motor constituted of rotors and a fixed barrel.

The first rotor 52 and the second rotor 54 constitute a hollow stepping motor of a claw-pole type together with the fixed barrel 36. The first rotor 52 and the second rotor 54 work as rotators of the stepping motor and are rotated by magnetic fields generated in the fixed barrel 36. As shown in FIG. 5, a circumference of the first rotor 52 is a permanent magnet, which is magnetically polarized so as to alternately arrange north poles and south poles in a circumferential direction. A disk surface of the second rotor 54 is a permanent magnet, which is magnetically polarized so as to alternately arrange north poles and south poles in a rotational direction.

Meanwhile, the fixed barrel 36 includes a first coil portion 62, a second coil portion 63 and a third coil portion 64 respectively having a built-in coil. The respective coil portions 62, 63 and 64 are disposed side by side so as to make axes thereof coincide with the optical axis 51. The first rotor 52 is disposed inside the first and second coil portions 62 and 63. The second rotor 54 is disposed so as to interpose the disk surface thereof between the second and third coil portions 63 and 64.

As to the first coil portion 62, the coil is contained in a yoke made of magnetic material of iron and so forth, for instance. A rectangular-wave-shaped gap is formed in the yoke. In virtue of this gape, teeth 62a and 62b meshing with each other are formed at an inner surface of the first coil portion 62.

When a current flows in the first coil portion 62 in a forward direction (clockwise direction in the drawing), concentric lines of magnetic force are generated in the coil around the current (so-called right-handed screw rule). The generated line of the magnetic force passes through the inside of the yoke made of the magnetic material, and is discharged into the air after reaching the tooth 62b. The discharged line of the magnetic force passes through the gap and enters the yoke again from the tooth 62a. Thus, the magnetic field of south pole is generated at the tooth 62a, and the magnetic field of north pole is generated at the tooth 62b. In contrast, when the current flows in the first coil portion 62 in a backward direction (counterclockwise direction in the drawing), the line of the magnetic force is reversely generated. Consequently, the magnetic field of north pole is generated at the tooth 62a, and the magnetic field of south pole is generated at the tooth 62b.

Similarly, teeth 63a and 63b are formed at an inner surface of the second coil portion 63. When the current flows in the second coil portion 63 in the forward direction, the tooth 63a is magnetically polarized in south pole and the tooth 63b is magnetically polarized in north pole. By contrast, when the current flows in the backward direction, the tooth 63a is magnetically polarized in north pole and the tooth 63b is magnetically polarized in south pole. The teeth 63a and 63b of the second coil portion 63 extend toward an end surface of the third coil portion 64. By doing so, the end surface of the third coil portion 64 is magnetically polarized as well in addition to the inner surface of the second coil portion 63 when the current flows in the second coil portion 63 (see FIG. 7). The second coil portion 63 is disposed such that the teeth 63a and 63b are shifted relative to the teeth 62a and 62b of the first coil portion 62 by the half of the tooth.

The third coil portion 64 also has teeth 64a and 64b formed at the end surface of the side of the second coil portion 63. When the current flows in the third coil portion 64 in the forward direction, the tooth 64a is magnetically polarized in south pole and the tooth 64b is magnetically polarized in north pole. In contrast, when the current flows in the backward direction, the tooth 63a is magnetically polarized in north pole and the tooth 64b is magnetically polarized in south pole. The third coil portion 64 is disposed such that the teeth 64a and 64b are shifted relative to the teeth 63a and 63b of the second coil portion 63 by the half of the tooth.

Figure 8:
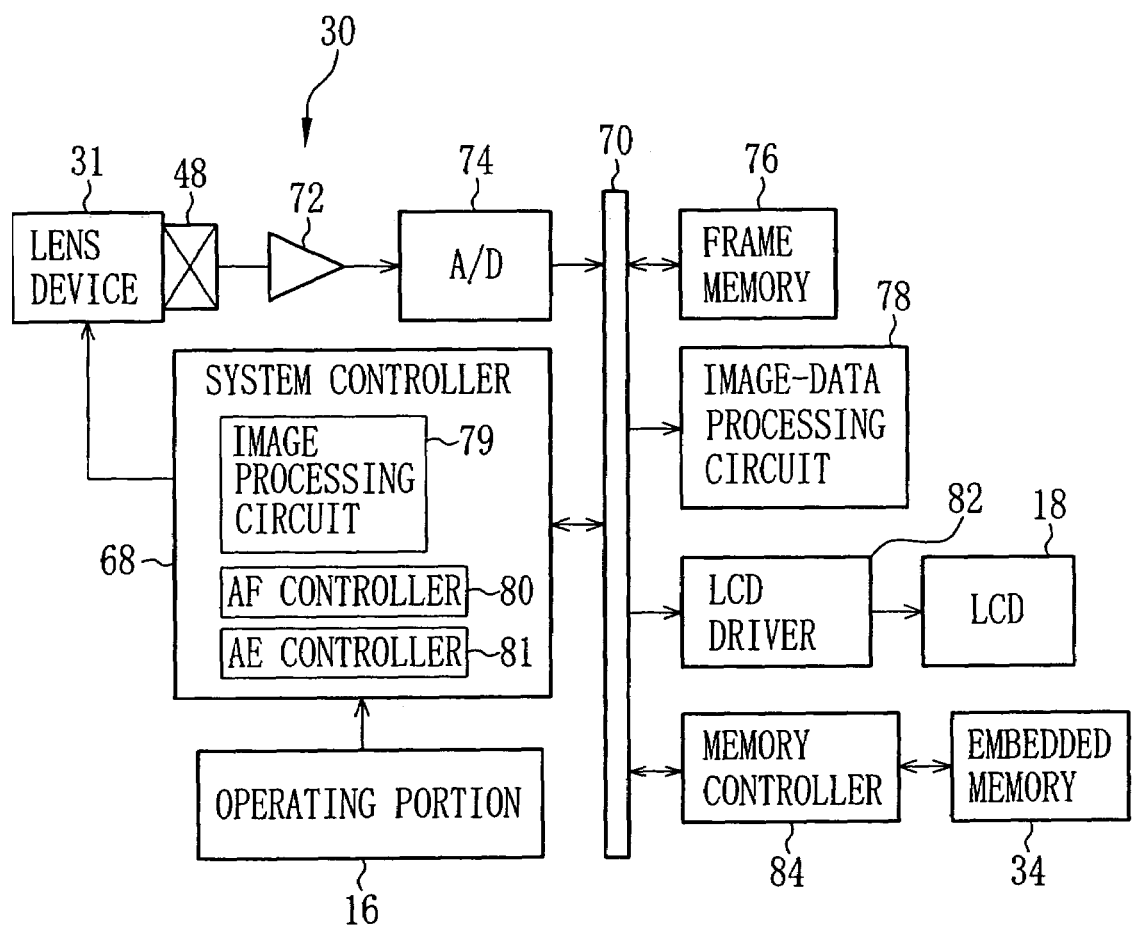
FIG. 8 is a block diagram of an electronic camera.

The respective coil portions 62, 63 and 64 are connected to a system controller 68 of the electronic camera 30 (see FIG. 8). The system controller 68 changes the magnetic fields, which are generated in the respective coil portions 62, 63 and 64, by controlling the current flowing in the respective coil portions 62, 63 and 64 to rotate the first rotor 52 and the second rotor 54.

Figure 6A:
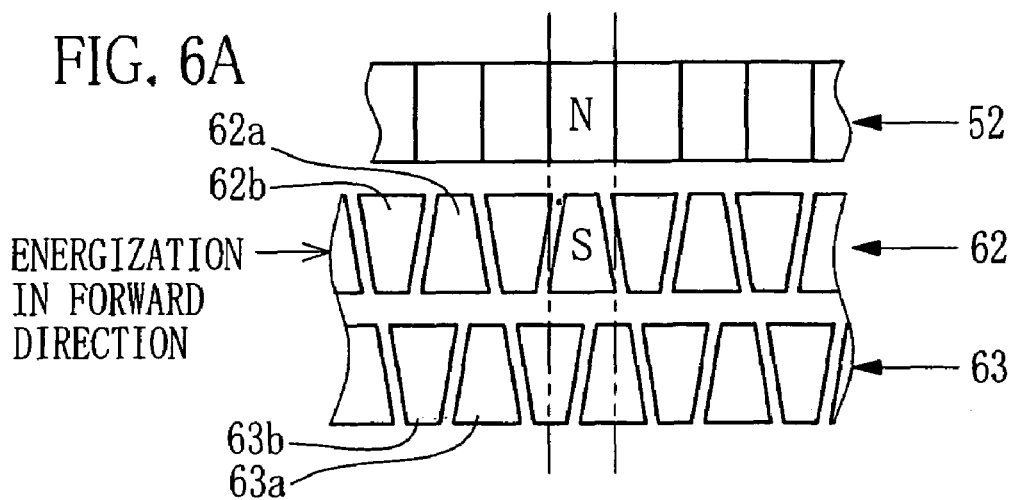
FIGS. 6A to 6C are explanatory illustrations showing a sequence for rotating the first rotor in a forward direction.

Hereinafter, sequence for rotating the respective rotors 52 and 54 is described below, referring to FIGS. 6 and 7. Incidentally, a state shown in FIG. 6A is defined as a reference state of the first rotor 52 in that the teeth 62a and 62b are magnetically polarized in south pole and north pole respectively by letting the current flow in the first coil portion 62 in the forward direction. In this state, the magnetically-polarized teeth 62a and 62b attract and retain the respective counterparts of the magnetic poles of the first rotor 52. Moreover, a state shown in FIG. 7A is defined as a reference state of the second rotor 54 in that the teeth 64a and 64b are magnetically polarized in south pole and north pole respectively by letting the current flow in the third coil portion 64 in the forward direction. In this state, the magnetically-polarized teeth 64a and 64b attract and retain the respective counterparts of the magnetic poles of the second rotor 54.

Figure 6B:
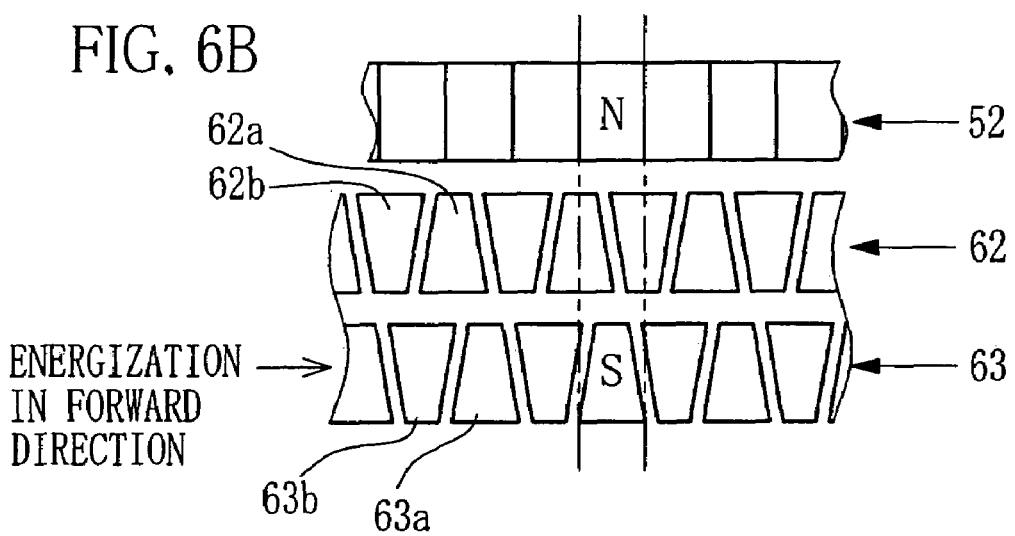
Figure 6C:
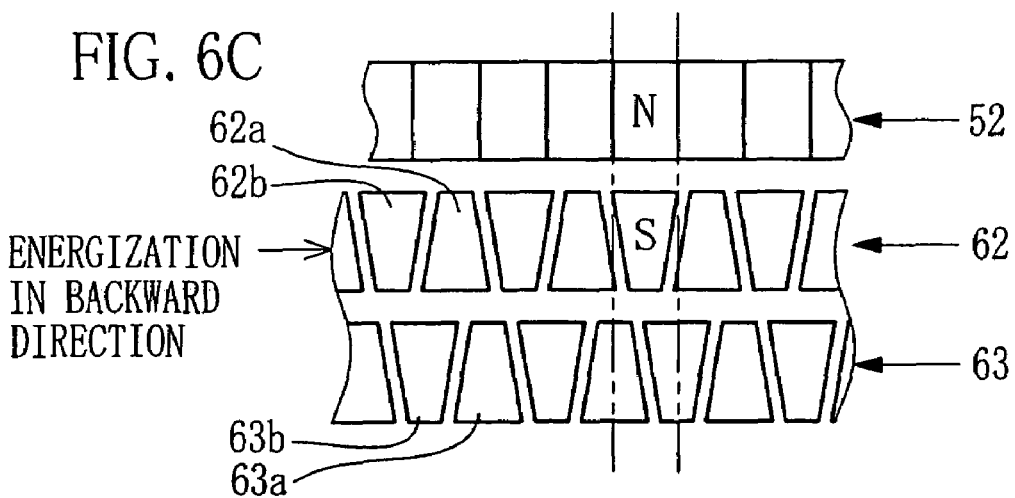
Figure 7A:
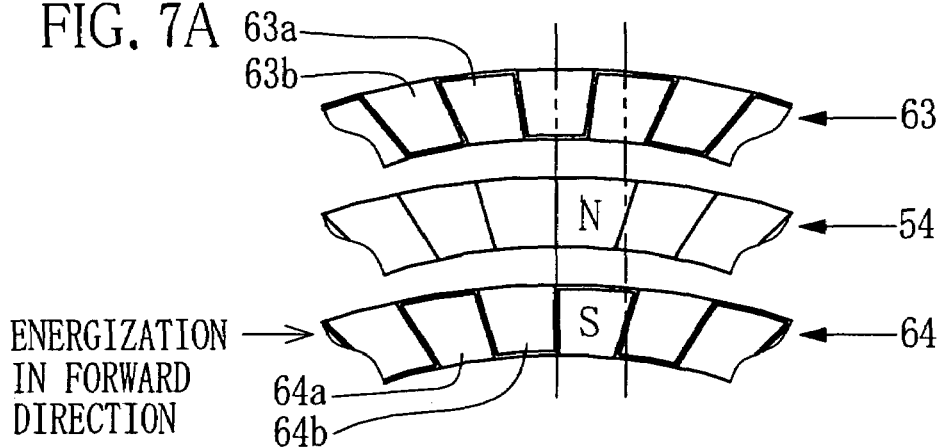
FIGS. 7A to 7C are explanatory illustrations showing a sequence for rotating the second rotor in the forward direction.

For rotating the first rotor 52 in the forward direction, it is performed first in the reference state shown in FIG. 6A to let the current flow in the second coil portion 63 in the forward direction such as shown in FIG. 6B. As described above, the positions of the teeth 63a and 63b of the second coil portion 63 are shifted relative to the positions of the teeth 62a and 62b of the first coil portion 62 by the half of the tooth. Thus, the first rotor 52 is attracted by each of the magnetically-polarized teeth 63a and 63b of the second coil portion 63 to rotate in the forward direction by the half of the tooth. Successively, it is performed to let the current flow in the first coil portion 62 in the backward direction such as shown in FIG. 6C. Upon this, the first rotor 52 further rotates in the forward direction by the half of the tooth. In this way, the first rotor 52 rotates from the reference state by the amount corresponding to one tooth (by one step).

Further, in this state, it is performed to let the current flow in the second coil portion 63 in the backward direction. And then, it is performed to let the current flow in the first coil portion 62 in the forward direction to rotate the first rotor 52 by two steps. After that, it is repeatedly performed to let the current flow in the similar manner. After rotating the first rotor 52 by desired steps, it is performed to let the current continuously flow in the first coil portion 62 so that the first rotor 52 is retained at the current position.

Meanwhile, for rotating the first rotor 52 in the backward direction, it is performed in the reference state shown in FIG. 6A to let the current flow in the second coil portion 63 in the backward direction. And then, it is performed to let the current flow in the first coil portion 62 in the backward direction. Thereupon, the first rotor 52 rotates in the backward direction by one step. Further, in this state, it is performed to let the current flow in the second coil portion 63 in the forward direction. And then, it is performed to let the current flow in the first coil portion 62 in the forward direction. In total, the first rotor 52 rotates by two steps. After rotating the first rotor 52 by desired steps, it is performed to let the current continuously flow in the first coil portion 62 so that the first rotor 52 is retained at the current position.

Figure 7B:
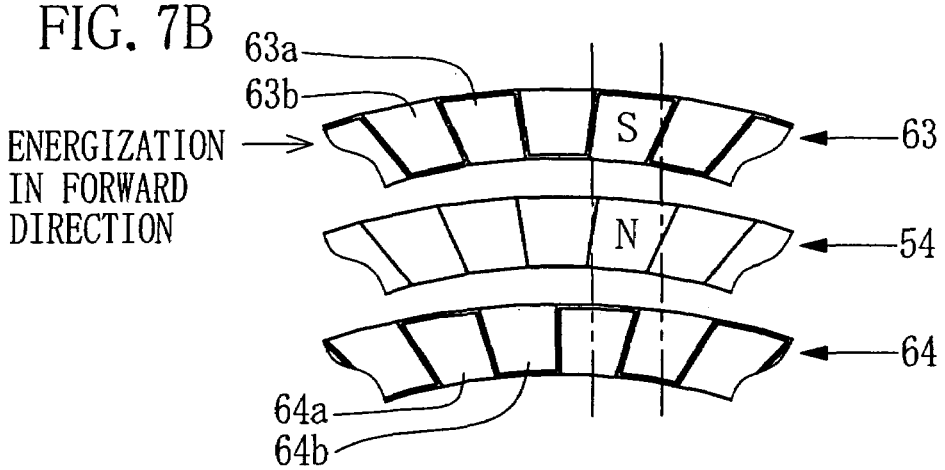
Figure 7C:
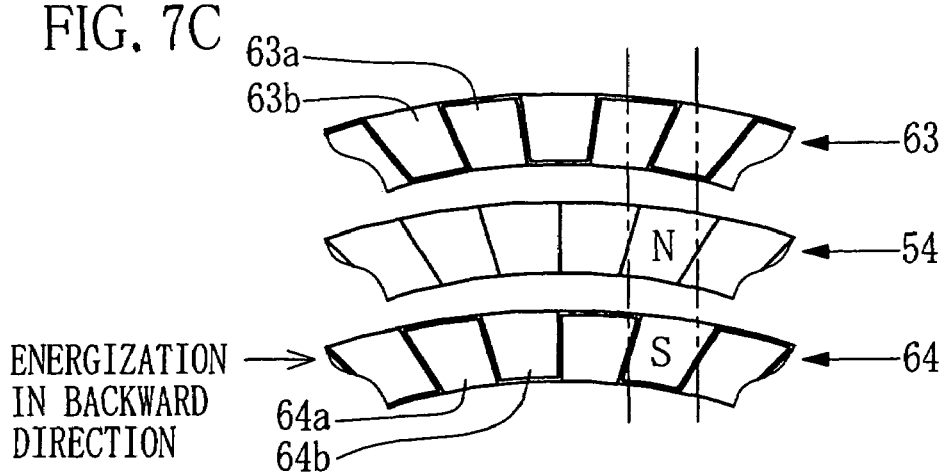

In the meantime, for rotating the second rotor 54 in the forward direction, it is performed in the reference state shown in FIG. 7A to let the current flow in the seconds coil portion 63 in the forward direction such as shown in FIG. 7B. The positions of the teeth 63a and 63b of the second coil portion 63 are shifted relative to the positions of the teeth 64a and 64b of the third coil portion 64 by the half of the tooth. Thus, the second rotor 54 is attracted by the magnetically-polarized teeth 63a and 63b of the second coil portion 63 to rotate in the forward direction by the half of the tooth. Successively, it is performed to let the current flow in the third coil portion 64 in the backward direction such as shown in FIG. 7C. Upon this, the second rotor 54 further rotates in the forward direction by the half of the tooth. In this way, the second rotor 54 rotates from the reference state by the amount corresponding to one tooth (by one step).

Further, in this state, it is performed to let the current flow in the second coil portion 63 in the backward direction. And then, it is performed to let the current flow in the third coil portion 64 in the forward direction to rotate the second rotor 54 by two steps. After that, it is repeatedly performed to let the current flow in the similar manner. After rotating the second rotor 54 by desired steps, it is performed to let the current continuously flow in the third coil portion 64 so that the second rotor 54 is retained at the current position.

Meanwhile, for rotating the second rotor 54 in the backward direction, it is performed in the reference state shown in FIG. 7A to let the current flow in the second coil portion 63 in the backward direction. And then, it is performed to let the current flow in the third coil portion 64 in the backward direction. Thereupon, the second rotor 54 rotates in the backward direction by one step. Further, in this state, it is performed to let the current flow in the second coil portion 63 in the forward direction. And then, it is performed to let the current flow in the third coil portion 64 in the forward direction. In total, the second rotor 54 rotates by two steps. After rotating the second rotor 54 by desired steps, it is performed to let the current continuously flow in the third coil portion 64 so that the second rotor 54 is retained at the current position.

FIG. 8 is a functional block diagram showing an electrical structure of the electronic camera 30, which employs the lens device 31 having the above-described structure. The electronic camera 30 comprises the system controller 68, which is constituted by a microcomputer, in order to integrally control all sections. The system controller 68 is connected to the respective sections of the electronic camera 30 via a data bus 70 to control the connected sections in response to operations inputted from the operating portion 16.

As well known, the CCD 48 disposed behind the lens device 31 includes many photoelectric transducers arranged on a light receiving surface. The CCD 48 photoelectrically converts the subject light, which is focused by the taking lens 32, into an image signal. When the camera-equipped cell-phone 10 is switched to the camera mode, the system controller 68 activates the CCD 48 to obtain the image signal.

The image signal sequentially outputted from the CCD 48 is amplified up to a proper level by a preamplifier 72 of a gain variable type, and is converted into digital image data by an A/D converter 74. The image data obtained in this way is sequentially written in a frame memory 76 being as a working memory. The frame memory 76 temporarily stores the image data for which various kinds of image processing are performed by an image processing circuit 79, an AF controller 80 and an AE controller 81, which are included in the system controller 68.

For the image data stored in the frame memory 76, an image-data processing circuit 78 performs well-known image processing of gamma correction, white-balance correction, image-quality correction and so forth. The image data processed by the image-data processing circuit 78 is displayed as a through image on the LCD 18 via an LCD driver 82. Alternatively, the image data processed by the processing circuit 78 is recorded in the embedded memory 34 via a memory controller 84.

The AF controller 80 performs focus adjustment on the basis of the image data stored in the frame memory 76. The AF controller 80 controls the currents flowing in the first and second coil portions 62 and 63, which are disposed in the fixed barrel 36 of the lens device 31, to rotate the first rotor 52 so that the taking lens 32 is moved together with the movable barrel 42 to perform the focus adjustment. The AF controller 80 checks contrast components of the obtained image data while moving the taking lens 32 back and forth. A position of the taking lens 32 where the contrast is highest is detected as a focus position, and the taking lens 32 is moved to the detected focus position.

The AE controller 81 controls the currents flowing in the second and third coil portions 63 and 64, which are disposed in the fixed barrel 36 of the lens device 31, to rotate the second rotor 54 so that the aperture mechanism 56 is driven to perform aperture adjustment. The AE controller 81 determines a diameter of the aperture 59, by which optimum shooting conditions are obtained, on the basis of the image data stored in the frame memory 76. The aperture mechanism 56 is driven so as to make the aperture 59 have the determined diameter.

An operation of the present invention having the above structure is described below. Upon setting the camera-equipped cell-phone 10 to the camera mode, the CCD 48 commences to obtain the image signal, and the obtained image data is displayed on the LCD 18 as the through image.

Moreover, the focus adjustment and the aperture adjustment are performed in synchronism with the display of the through image. The system controller 68 lets the currents flow in the respective coils of the first and second coil portions 62 and 63 in the forward and backward directions to rotate the first rotor 52. The taking lens 32 is moved together with the movable barrel 42 to perform the focus adjustment. Further, the system controller 68 lets the currents flow in the respective coils of the second and third coil portions 63 and 64 in the forward and backward directions to rotate the second rotor 54. The aperture mechanism 56 is driven to perform the aperture adjustment.

Next, with respect to the second embodiment of the present invention, another camera-equipped cell-phone loaded with a lens device is described below. In FIG. 9, the front of the camera-equipped cell-phone 110 is provided with an operating portion 116 for performing various operations, and a liquid-crystal display panel (LCD) 118 for displaying various images. Moreover, a speaker 120 and a microphone 122 to be used at a time of a phone call are also provided. In FIG. 10, the rear of the camera-equipped cell-phone 110 is provided with a battery 124 for supplying an electric power. The battery 124 is detachably attached. In addition, the lens device 131 constituting an electronic camera 130 (see FIG. 16) is also provided. A taking lens 132 built in the lens device 131 is exposed at the rear of the camera-equipped cell-phone 110.

The camera-equipped cell-phone 110 has a phone-call mode for making a call by using the speaker 120 and the microphone 122, and a camera mode for capturing a subject light, which is obtained through the taking lens 132, in an embedded memory 134 (see FIG. 16) as digital image data. The respective modes are switched by handling the operating portion 116. Further, by handling the operating portion 116, it is possible to input telephone numbers under the phone-call mode and to perform various operations of shutter release, zooming and so forth under the camera mode. The LCD 118 shows the images, which are stored in the embedded memory 134, and various information pictures of a menu picture and so forth. Additionally, the LCD 118 shows a so-called through image under the camera mode for the purpose of framing.

Figure 11:
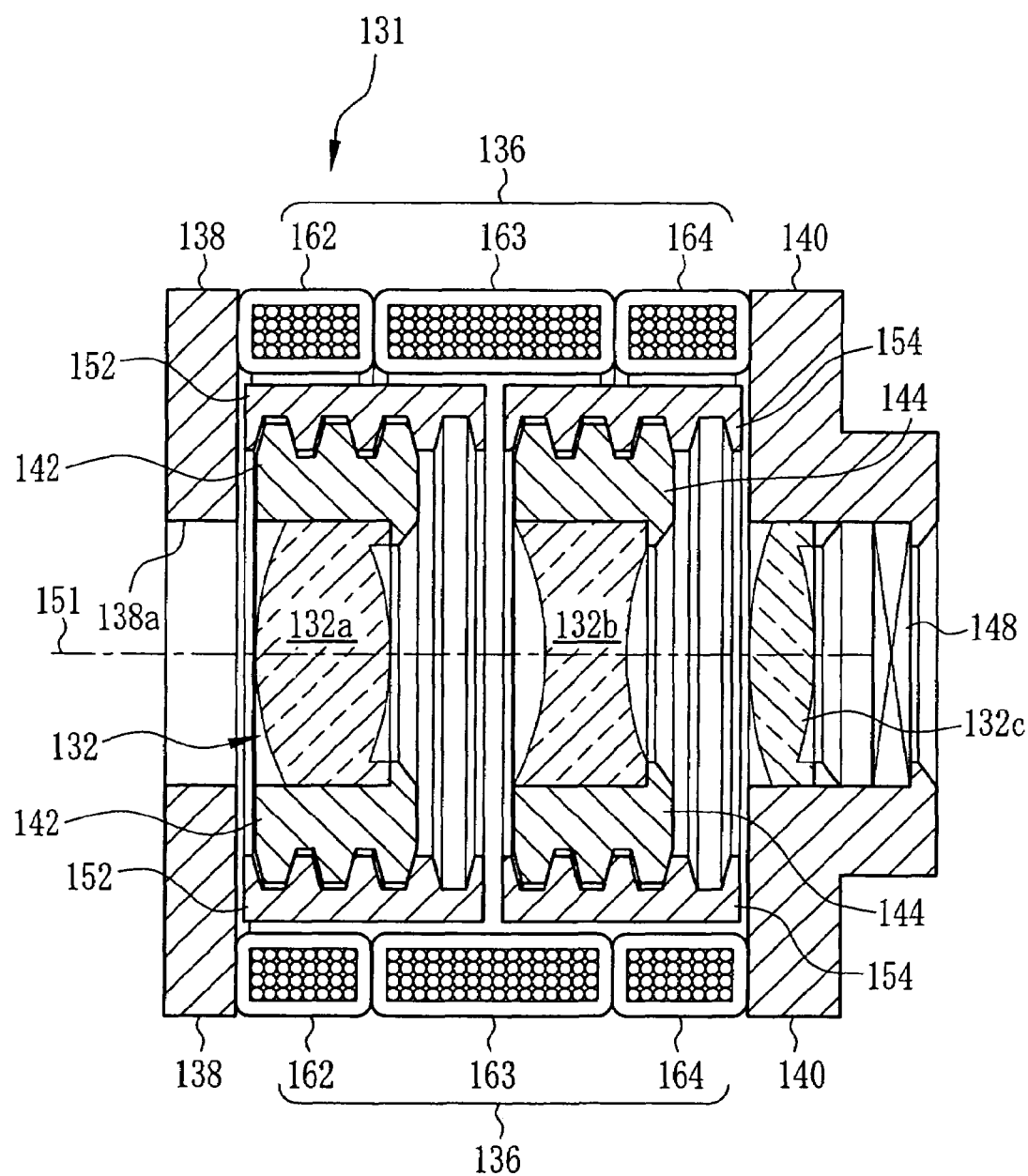
FIG. 11 is a section view of a lens device.

As shown in FIG. 11, the lens device 131 comprises a front cover 138 and a rear cover 140 so as to interpose a fixed barrel 136 between them. The taking lens 132 is exposed through an opening 138a of the front cover 138. The taking lens 132 includes a first lens 132a, a second lens 132b and a third lens 132c. The first lens 132a is contained in a first movable barrel 142. The second lens 132b is contained in a second movable barrel 144. The third lens 132c is contained in the rear cover 140. The respective lenses 132a, 132b and 132c of the taking lens 132 refract the subject light entering along an optical axis 151 to form an image on a light-receiving surface of a CCD 148 disposed behind the lens device 131.

Figure 12:
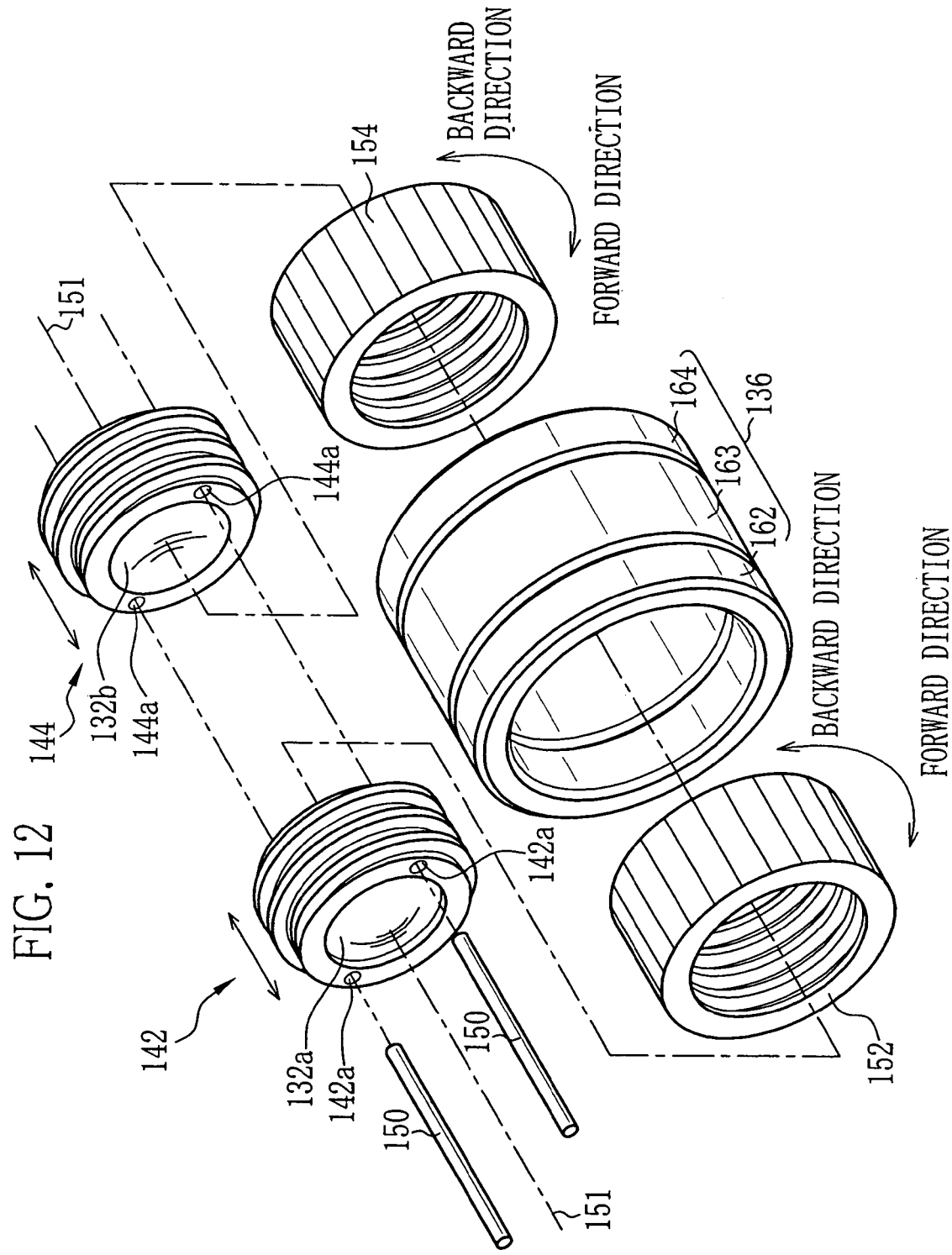
FIG. 12 is a perspective view of the lens device.

As shown in FIG. 12, the first and second movable barrels 142 and 144 are slidably supported in a direction of the optical axis 151 by means of guide rods 150, which are inserted into guide holes 142a and 144a respectively formed at lateral sides of the movable barrels 142 and 144. The first and second lenses 132a and 132b are movable lenses to be slid in the direction of the optical axis 151 together with the first and second movable barrels 142 and 144 respectively. In this embodiment, the first lens 132a is moved to perform zooming, and the second lens 132b is moved to perform focus adjustment.

A first rotor 152 is disposed at the outside of the first movable barrel 142 so as to connect with each other via a helicoid mechanism. When the first rotor 152 is rotated in a forward direction (clockwise direction in the drawing), the first movable barrel 142 of which rotation is regulated by the guide rods 150 is moved toward the front cover 138 so as to be pushed. In contrast, when the first rotor 152 is rotated in a backward direction (counterclockwise direction in the drawing), the first movable barrel 142 is moved toward the rear cover 140.

Similarly, a second rotor 154 is disposed at the outside of the second movable barrel 144 so as to connect with each other via a helicoid mechanism. When the second rotor 154 is rotated in the forward direction, the second movable barrel 144 is moved toward the front cover 138. When the second rotor 154 is rotated in the backward direction, the second movable barrel 144 is moved toward the rear cover 140.

Figure 13:
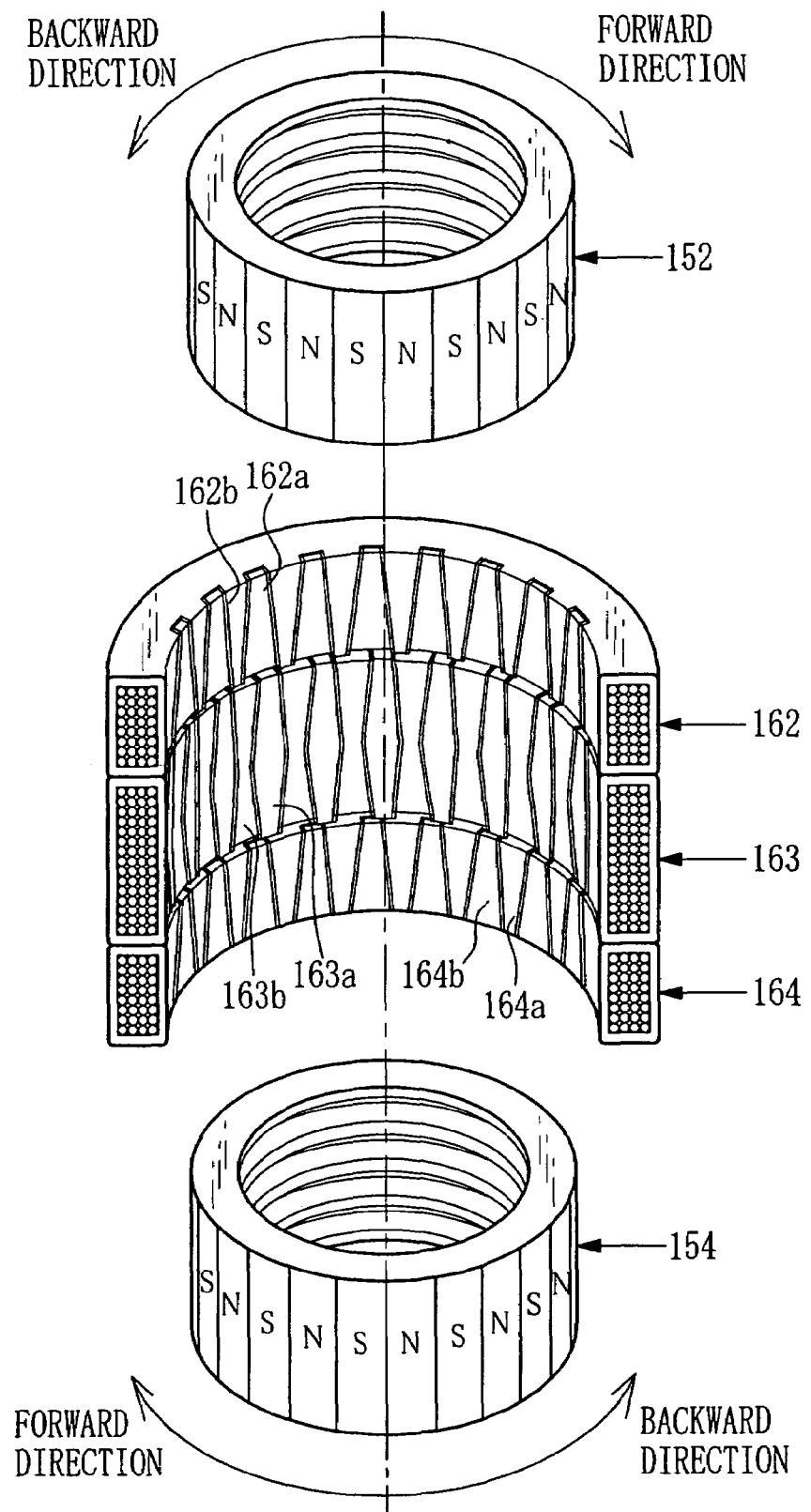
FIG. 13 is an explanatory illustration of a hollow stepping motor constituted of rotors and a fixed barrel.

The fixed barrel 136 is disposed at the outside of the first and second rotors 152 and 154 so as to surround these rotors. The fixed barrel 136 and the respective rotors 152 and 154 constitute a hollow stepping motor of a claw-pole type. As shown in FIG. 13, a circumference of each of the rotors 152 and 154 is a permanent magnet, which is magnetically polarized so as to alternately arrange north poles and south poles in a circumferential direction.

Meanwhile, the fixed barrel 136 includes a first coil portion 162, a second coil portion 163 and a third coil portion 164 respectively having a built-in coil. The fixed barrel 136 is disposed such that the first coil portion 162 surrounds the front-cover side of the first rotor 152, and the second coil portion 163 surrounds both of the rear-cover side of the first rotor 152 and the front-cover side of the second rotor 154, and the third coil portion 164 surrounds the rear-cover side of the second rotor 154 (see FIG. 11).

As to the first coil portion 162, the coil is contained in a yoke made of magnetic material of iron and so forth, for instance. A rectangular-wave-shaped gap is formed in the yoke. In virtue of this gape, teeth 162a and 162b meshing with each other are formed at an inner surface of the first coil portion 162.

When a current flows in the first coil portion 162 in a forward direction (clockwise direction in FIG. 13), concentric lines of magnetic force are generated in the coil around the current (so-called right-handed screw rule). The generated line of the magnetic force passes through the inside of the yoke made of the magnetic material, and is discharged into the air after reaching the tooth 162b. The discharged line of the magnetic force passes through the gap and enters the yoke again from the tooth 162a. Thus, the magnetic field of south pole is generated at the tooth 162a, and the magnetic field of north pole is generated at the tooth 162b. In contrast, when the current flows in the first coil portion 162 in a backward direction (counterclockwise direction in FIG. 13), the line of the magnetic force is reversely generated. Consequently, the magnetic field of north pole is generated at the tooth 162a, and the magnetic field of south pole is generated at the tooth 162b.

Similarly, teeth 163a and 163b are formed at an inner surface of the second coil portion 163. When the current flows in the second coil portion 163 in the forward direction, the tooth 163a is magnetically polarized in south pole and the tooth 163b is magnetically polarized in north pole. By contrast, when the current flows in the second coil portion in the backward direction, the tooth 163a is magnetically polarized in north pole and the tooth 163b is magnetically polarized in south pole. Further, teeth 164a and 164b are formed at the third coil portion 164. When the current flows in the third coil portion 164 in the forward direction, the tooth 164a is magnetically polarized in south pole and the tooth 164b is magnetically polarized in north pole. When the current flows in the third coil portion 164 in the backward direction, the tooth 164a is magnetically polarized in north pole and the tooth 164b is magnetically polarized in south pole.

The adjacent coil portions of the coil portions 162, 163 and 164 are disposed so as to be shifted by the half of the tooth. Moreover, the respective coil portions 162, 163 and 164 are connected to a system controller 168 of the electronic camera 130 (see FIG. 16). The system controller 168 controls the currents flowing in the respective coil portions 162, 163 and 164 to change the magnetic fields generated at the inner surfaces of the respective coil portions 162, 163 and 164 so that the first and second rotors 152 and 154 are rotated.

Figure 14A:
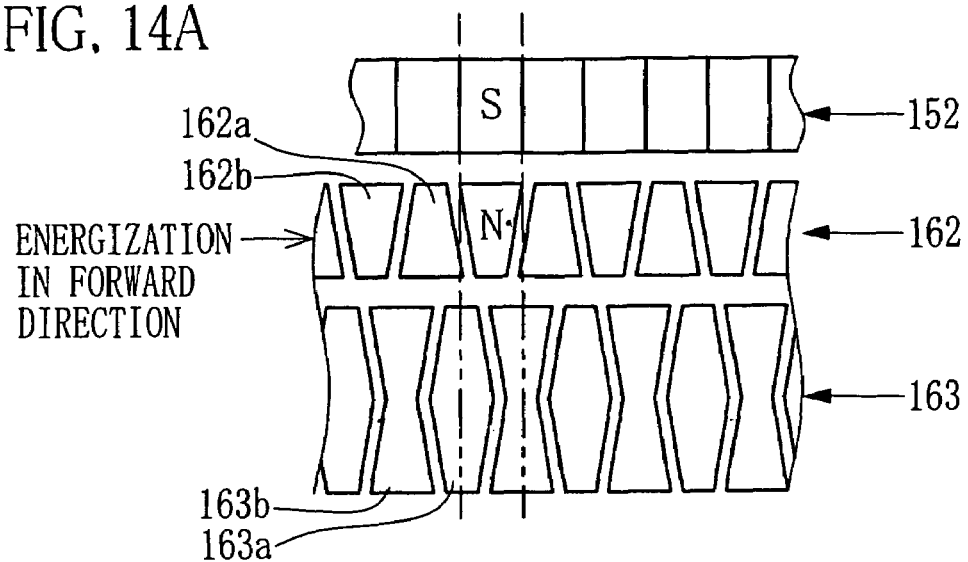
FIGS. 14A to 14C are explanatory illustrations showing a sequence for rotating the first rotor in a forward direction.

Hereinafter, sequence for rotating the respective rotors 152 and 154 is described below, referring to FIGS. 14 and 15. Incidentally, a state shown in FIG. 14A is defined as a reference state of the first rotor 152 in that the teeth 162a and 162b are magnetically polarized in south pole and north pole respectively by letting the current flow in the first coil portion 162 in the forward direction. In this state, the magnetically-polarized teeth 162a and 162b attract and retain the respective counterparts of the magnetic poles of the first rotor 152. Moreover, a state shown in FIG. 15A is defined as a reference state of the second rotor 154 in that the teeth 164a and 164b are magnetically polarized in south pole and north pole respectively by letting the current flow in the third coil portion 164 in the forward direction. In this state, the magnetically-polarized teeth 164a and 164b attract and retain the respective counterparts of the magnetic poles of the second rotor 154.

Figure 14B:
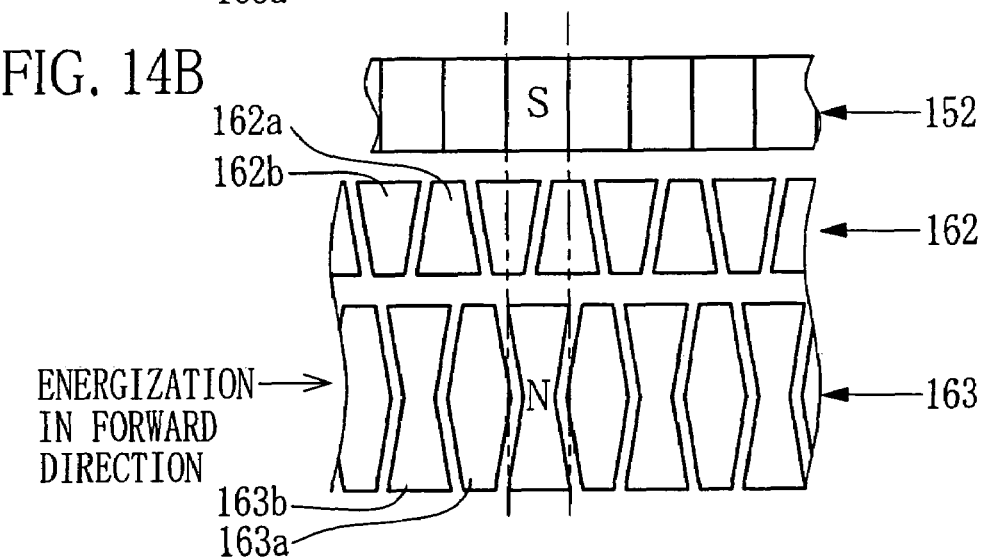
Figure 14C:
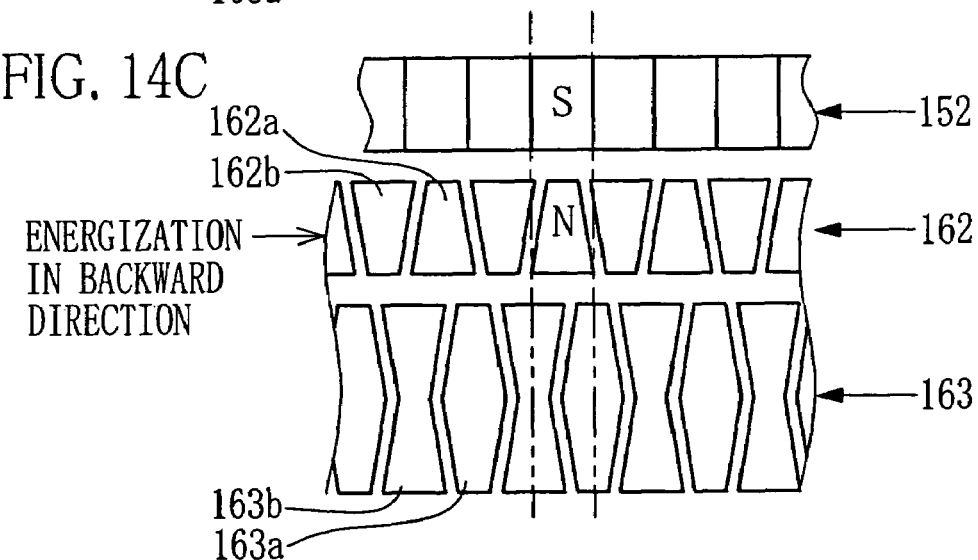

For rotating the first rotor 152 in the forward direction, it is performed first in the reference state shown in FIG. 14A to let the current flow in the second coil portion 163 in the forward direction such as shown in FIG. 14B. As described above, the positions of the teeth 163a and 163b of the, second coil portion 163 are shifted relative to the positions of the teeth 162a and 162b of the first coil portion 162 by the half of the tooth. Thus, the first rotor 152 is attracted by each of the magnetically-polarized teeth 163a and 163b of the second coil portion 163 to rotate in the forward direction by the half of the tooth. Successively, it is performed to let the current flow in the first coil portion 162 in the backward direction such as shown in FIG. 14C. Upon this, the first rotor 152 further rotates in the forward direction by the half of the tooth. In this way, the first rotor 152 rotates from the reference state by the amount corresponding to one tooth (by one step).

Further, in this state, it is performed to let the current flow in the second coil portion 163 in the backward direction. And then, it is performed to let the current flow in the first coil portion 162 in the forward direction to rotate the first rotor 152 by two steps. After that, it is repeatedly performed to let the current flow in the similar manner. After rotating the first rotor 152 by desired steps, it is performed to let the current continuously flow in the first coil portion 162 so that the first rotor 152 is retained at the current position.

Meanwhile, for rotating the first rotor 152 in the backward direction, it is performed in the reference state shown in FIG. 14A to let the current flow in the second coil portion 163 in the backward direction. And then, it is performed to let the current flow in the first coil portion 162 in the backward direction. Thereupon, the first rotor 152 rotates in the backward direction by one step. Further, in this state, it is performed to let the current flow in the second coil portion 163 in the forward direction. And then, it is performed to let the current flow in the first coil portion 162 in the forward direction. In total, the first rotor 152 rotates by two steps. After rotating the first rotor 152 by desired steps, it is performed to let the current continuously flow in the first coil portion 162 so that the first rotor 152 is retained at the current position.

In the meantime, for rotating the second rotor 154 in the forward direction, it is performed in the reference state shown in FIG. 15A to let the current flow in the seconds coil portion 163 in the forward direction such as shown in FIG. 15B. The positions of the teeth 163a and 163b of the second coil portion 163 are shifted relative to the positions of the teeth 164a and 164b of the third coil portion 164 by the half of the tooth. Thus, the second rotor 154 is attracted by the magnetically-polarized teeth 163a and 163b of the second coil portion 163 to rotate in the forward direction by the half of the tooth. Successively, it is performed to let the current flow in the third coil portion 164 in the backward direction such as shown in FIG. 15C. Upon this, the second rotor 154 further rotates in the forward direction by the half of the tooth. In this way, the second rotor 154 rotates from the reference state by the amount corresponding to one tooth (by one step).

Further, in this state, it is performed to let the current flow in the second coil portion 163 in the backward direction. And then, it is performed to let the current flow in the third coil portion 164 in the forward direction to rotate the second rotor 154 by two steps. After that, it is repeatedly performed to let the current flow in the similar manner. After rotating the second rotor 154 by desired steps, it is performed to let the current continuously flow in the third coil portion 164 so that the second rotor 154 is retained at the current position.

Meanwhile, for rotating the second rotor 154 in the backward direction, it is performed in the reference state shown in FIG. 15A to let the current flow in the second coil portion 163 in the backward direction. And then, it is performed to let the current flow in the third coil portion 164 in the backward direction. Thereupon, the second rotor 154 rotates in the backward direction by one step. Further, in this state, it is performed to let the current flow in the second coil portion 163 in the forward direction. And then, it is performed to let the current flow in the third coil portion 164 in the forward direction. In total, the second rotor 154 rotates by two steps. After rotating the second rotor 154 by desired steps, it is performed to let the current continuously flow in the third coil portion 164 so that the second rotor 154 is retained at the current position.

Figure 16:
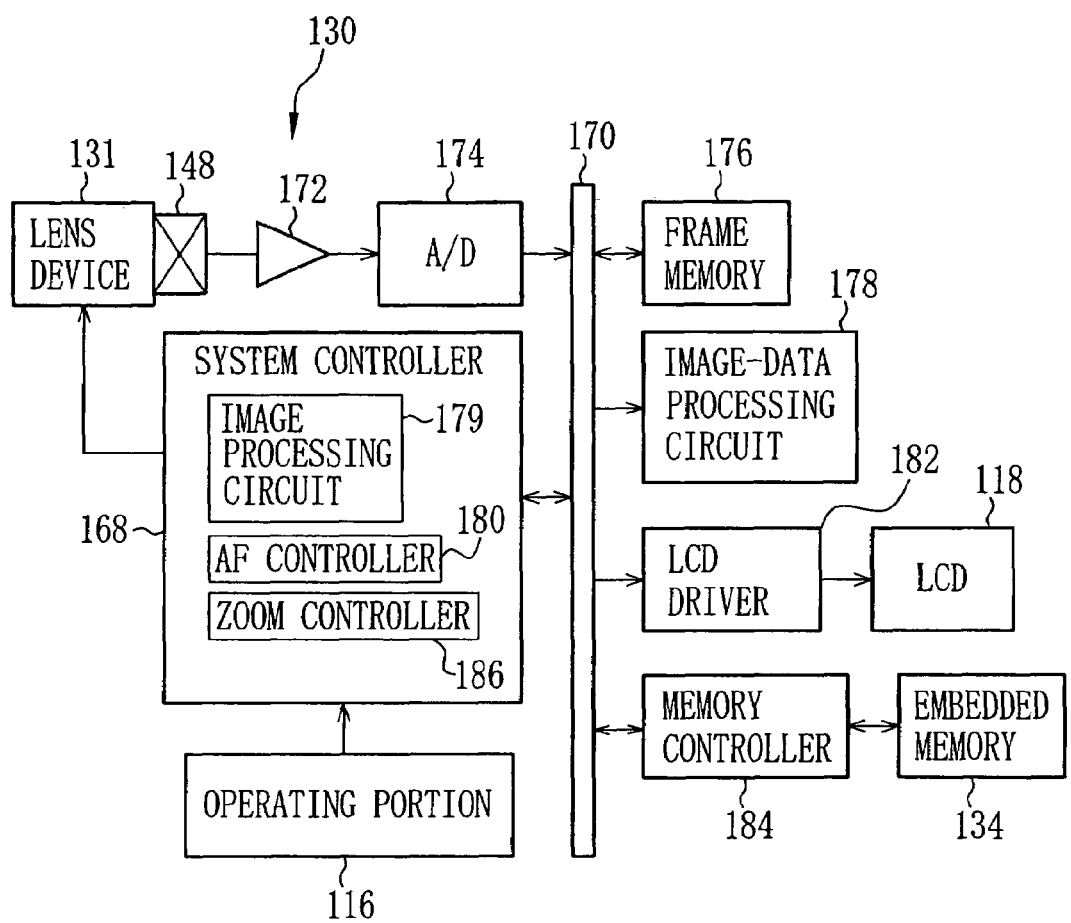
FIG. 16 is a block diagram of an electronic camera.

FIG. 16 is a functional block diagram showing an electrical structure of the electronic camera 130, which employs the lens device 131 having the above-described structure. The electronic camera 130 comprises the system controller 168, which is constituted by a microcomputer, in order to integrally control all sections. The system controller 168 is connected to the respective sections of the electronic camera 130 via a data bus 170 to control the connected sections in response to operations inputted from the operating portion 116.

As well known, the CCD 148 disposed behind the lens device 131 includes many photoelectric transducers arranged on a light receiving surface. The CCD 148 photoelectrically converts the subject light, which is focused by the taking lens 132, into an image signal. When the camera-equipped cellphone 110 is switched to the camera mode, the system controller 168 activates the CCD 148 to obtain the image signal.

The image signal sequentially outputted from the CCD 148 is amplified up to a proper level by a preamplifier 172 of a gain variable type, and is converted into digital image data by an A/D converter 174. The image data obtained in this way is sequentially written in a frame memory 176 being as a working memory. The frame memory 76 temporarily stores the image data for which various kinds of image processing are performed by an image processing circuit 179 and an AF controller 180, which are included in the system controller 168.

For the image data stored in the frame memory 176, an image-data processing circuit 178 performs well-known image processing of gamma correction, white-balance correction, image-quality correction and so forth. The image data processed by the image-data processing circuit 178 is displayed as a through image on the LCD 118 via an LCD driver 182. Alternatively, the image data processed by the processing circuit 178 is recorded in the embedded memory 134 via a memory controller 184.

The AF controller 180 performs focus adjustment on the basis of the image data stored in the frame memory 176. The AF controller 180 controls the currents flowing in the second and third coil portions 163 and 164, which are disposed in the fixed barrel 136 of the lens device 131, to rotate the second rotor 154 so that the second lens 132b is moved together with the second movable barrel 144 to perform the focus adjustment. The AF controller 180 checks contrast components of the obtained image data while moving the second lens 132b back and forth. A position of the second lens 132b where the contrast is highest is detected as a focus position, and the second lens 132b is moved to the detected focus position.

Further, the system controller 168 includes a zoom controller 186. On the basis of a zoom signal inputted from the operating portion 116, the zoom controller 186 controls the currents flowing in the first and second coil portions 162 and 163, which constitute the fixed barrel 136 of the lens device 131, to rotate the first rotor 152 so that the first lens 132a is moved together with the first movable barrel 142 to perform zooming of the taking lens 132.

An operation of the second embodiment having the above structure is described below. Upon setting the camera-equipped cell-phone 110 to the camera mode, the CCD 148 commences to obtain the image signal, and the obtained image data is displayed on the LCD 118 as the through image.

In synchronism with the display of the through image, the second lens 132b is moved to perform the focus adjustment on the basis of the obtained image data. The system controller 168 lets the currents flow in the respective coils of the second and third coil portions 163 and 164 in the forward and backward directions to rotate the second rotor 154. Upon rotation of the second rotor 154, the second lens 132b is moved together with the second movable barrel 144.

By handling the operating portion 116 during the display of the through image, the first lens 132a is moved to perform zooming. The system controller 168 lets the currents flow in the respective coils of the first and second coil portions 162 and 163 in the forward and backward directions to rotate the first rotor 152. Upon rotation of the first rotor 152, the first lens 132a is moved together with the first movable barrel 142.

As described in detail in the first and second embodiments of the lens device according to the present invention, the second coil portion is used for driving both of the first and second rotors in cooperation with the respective first and third coil portions. In virtue of this, it is possible to rotate two rotors by three coil portions. Thus, its size is reduced and the cost is lowered in comparison with a conventional way in that two rotors are rotated by four coil portions. Moreover, by using this lens device, it is possible to downsize the electronic camera and the camera-equipped cell-phone, and it is also possible to lower the cost thereof.

Incidentally, it is the subject matter of the present invention that the coil portion interposed between the other two coil portions is used so as to cooperate with the adjacent coil portions to rotate the two rotors. Therefore, its concrete structure is not limited to the above embodiments and may be properly changed. In the above embodiments, the tow rotors are rotated by the three coil portions. However, for example, four rotors may be rotated by five coil portions such as performed in a lens device 200 shown in FIG. 17. By the way, in FIG. 7, a member identical with that of the foregoing embodiment is denoted by the same reference numeral and description thereof is abbreviated.

Figure 17:
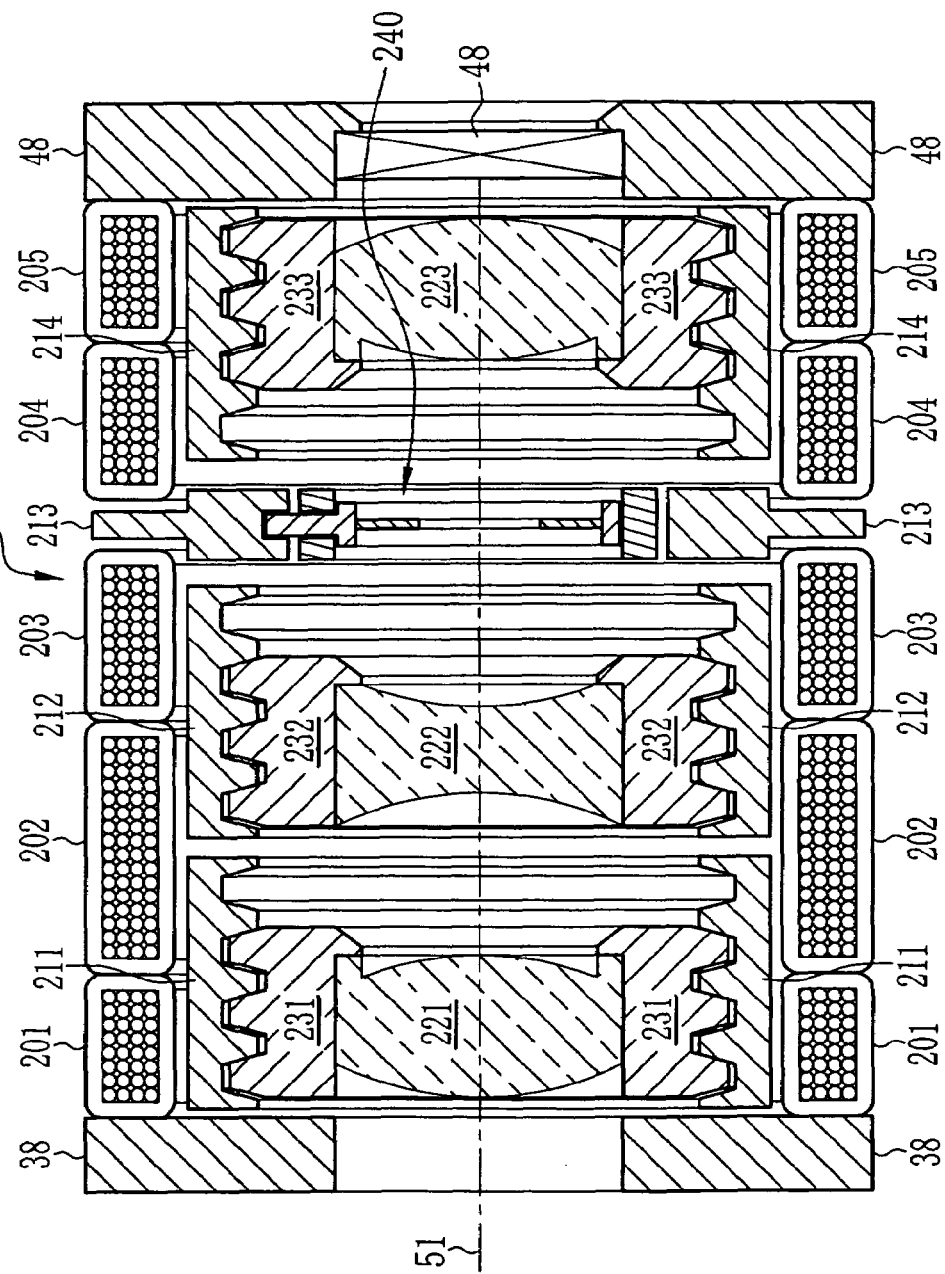
FIG. 17 is a section view of the lens device.
Figure 19A:
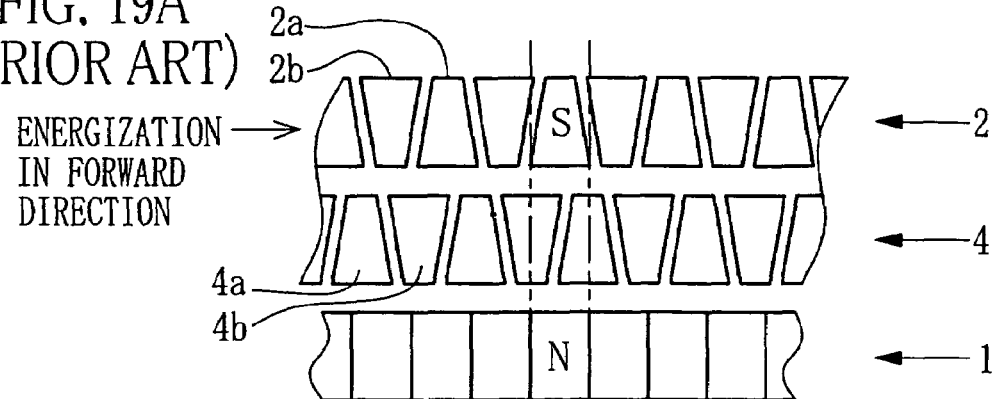
FIGS. 19A to 19D are explanatory illustrations showing a sequence for rotating the conventional hollow stepping motor in a forward direction.
Figure 19B:
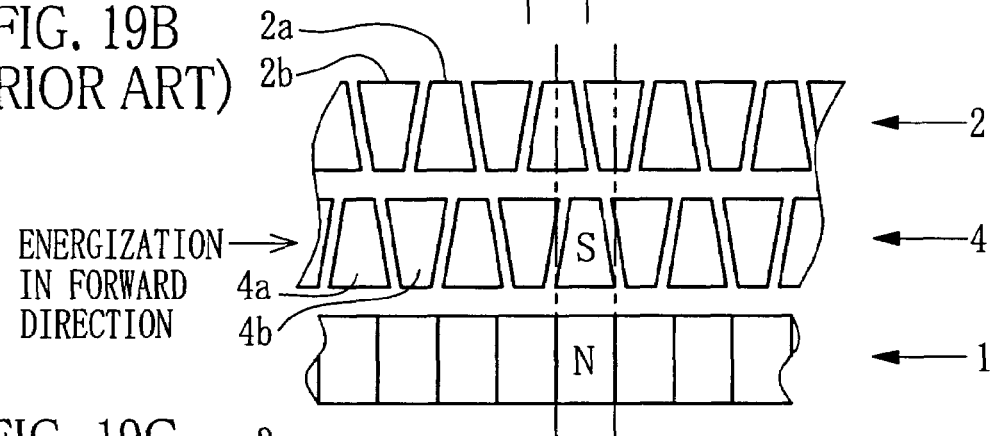
Figure 19C:
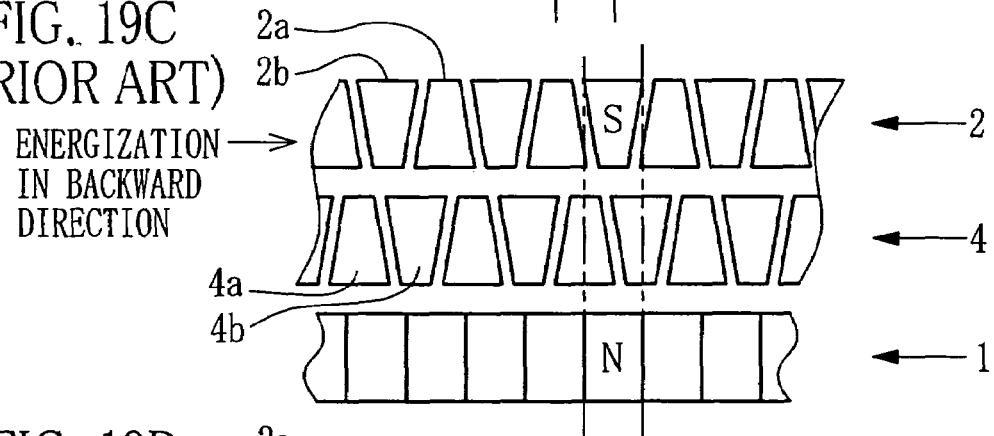
Figure 19D:
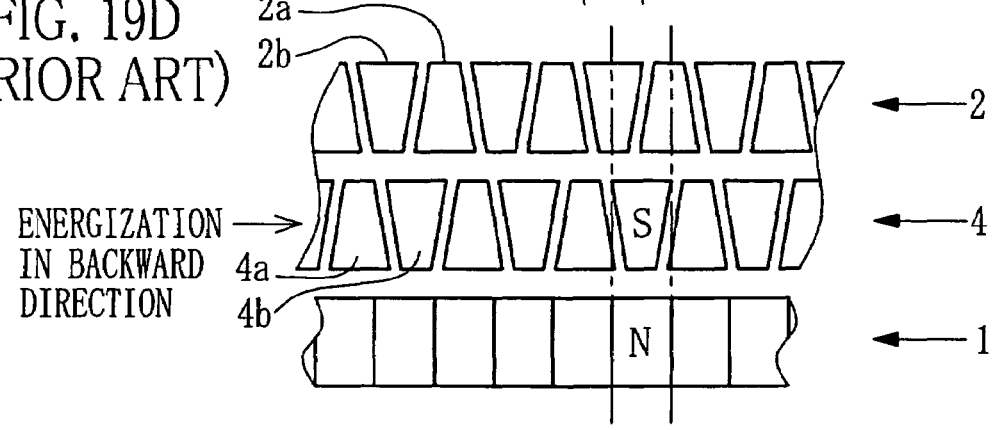

In FIG. 17, the lens device 200 comprises five coil portions 201 to 205 and four rotors 211 to 214. The first, second and fifth coil portions 201, 202 and 205 respectively generate magnetic fields at the insides thereof. The third and fourth coil portions 203 and 204 respectively generate magnetic fields at the insides thereof and at lateral sides thereof in a direction of the optical axis 51.

The first, second and fourth rotors 211, 212 and 214 are formed in a cylindrical shape and have south poles and north poles, which are alternately arranged at circumferential surfaces thereof. The third rotor 213 is formed in a hollow disk shape and has south poles and north poles, which are alternately arranged at disk surfaces thereof. The first rotor 211 is disposed inside the first coil portion 201 and a half of the second coil portion 202. The first rotor 211 is rotated by the magnetic fields generated in the first and second coil portions 201 and 202. The second rotor 212 is disposed inside another half of the second coil portion 202 and the third coil portion 203. The second rotor 212 is rotated by the magnetic fields generated in the second and third coil portions 202 and 203. The third rotor 213 is disposed so as to be interposed between the third and fourth coil portions 203 and 204. The third rotor 213 is rotated in virtue of the magnetic fields generated by the third and fourth coil portions 203 and 204 in the optical-axis direction. The fourth rotor 214 is disposed inside the fourth and fifth coil portions 204 and 205, and is rotated by the magnetic fields generated therein.

The first rotor 211 is connected to a first movable barrel 231, which holds a first lens 221, via a helicoid mechanism. Upon rotation of the first rotor 211, the first movable barrel 231 is moved in the optical-axis direction to drive the first lens 221. Similarly, the second rotor 212 is connected to a second movable barrel 232 holding a second lens 222, and the fourth rotor 214 is connected to a third movable barrel 233 holding a third lens 223. The second lens 222 is driven upon rotation of the second rotor 212, and the third lens 223 is driven upon rotation of the fourth rotor 214. The third rotor 213 is connected to an aperture mechanism 240 of a rotary drive type. Upon rotation of the third rotor 213, the aperture mechanism 240 is driven.

As described above, in the lens device 200, the five coil portions rotate the four rotors so that its size is reduced and its cost is lowered in comparison with a conventional way in that eight coil portions rotate four rotors. It is needless to say that four coil portions may rotate three rotors. The present invention is applicable to a case rotating five or more rotors, since it is sufficient that the coil portions are provided more than the rotors by one.

In the above embodiments, the disk-shaped rotor drives the aperture mechanism. However, a cylindrical rotor may drive the aperture mechanism. In this case, an engagement hole for engaging with a drive lever of the aperture mechanism is formed in an inner surface of the cylindrical rotor. In virtue of this, it is possible to drive the aperture mechanism by the cylindrical rotor. Further, in the above embodiments, the cylindrical rotor drives the movable lens. However, a disk-shaped rotor may drive the movable lens. In this case, a helicoid barrel having female helicoid formed at an inner surface thereof is attached to an inner surface of the disk-shaped rotor. The female helicoid engages with male helicoid of the movable barrel. In virtue of this, it is possible to drive the movable lens by the disk-shaped rotor. The shapes of the rotors for driving the aperture mechanism and the movable lens may be properly changed in accordance with specification of the lens device.

In the above embodiments, the aperture mechanism is used as a light-amount variable member to be driven. However, another light-amount variable member may be used. For example, a shutter mechanism and so forth may be driven.

The shutter mechanism moves a shutter blade to open an aperture. Further, in the above embodiment, the movable barrel and the rotary barrel are connected via the helicoid mechanism. However, the movable barrel and the rotary barrel may be connected via a cam mechanism, for example. The cam mechanism comprises a cam pin and a cam groove. The cam pin is formed on the movable barrel, and the cam groove is formed in the rotary barrel to engage with the cam pin of the movable barrel.

In the foregoing, the electronic camera built in the camera-equipped cell-phone is described. The present invention, however, is not limited to this and is applicable to a so-called silver salt camera in which a photographic film is exposed to record a subject image. Further, the present invention is also applicable to optical devices other than the camera, for example, a projector and a pick-up lens device used for reading data recorded in a CD-ROM, a DVD or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A stepping motor comprising:
   a plurality of hollow rotors on which magnetic substances having opposite polarities are alternately arranged in a circumferential direction, said rotors being disposed so as to make rotational axes thereof coincide with each other; and
   a fixed barrel for rotating said rotors, said fixed barrel including at least three cylindrical coil portions for alternately generating magnetic fields having opposite polarities in the circumferential direction in accordance with energization of said coil portions,
   wherein said rotors and said coil portions are disposed in a direction of said rotational axis, and in said fixed barrel, the coil portion interposed between the other two coil portions is used for rotating said rotors in cooperation with the adjacent coil portions.

2. A stepping motor according to claim 1, wherein said rotor is formed in a cylindrical shape and is disposed at an intermediate position of the inside of said adjacent two coil portions, said cylindrical rotor being rotated in virtue of the magnetic fields generated by said adjacent two coil portions at the inner peripheries thereof.

3. A stepping motor according to claim 1, wherein said rotor is formed in a hollow disk shape and is disposed so as to be interposed between said adjacent two coil portions, said disk-shaped rotor being rotated in virtue of the magnetic field generated by said adjacent two coil portions at lateral sides thereof in the direction of said rotational axis.

4. A stepping motor according to claim 1, wherein said rotors include a cylindrical rotor and a hollow disk-shaped rotor,
   said cylindrical rotor is disposed at an intermediate position of the inside of said adjacent two coil portions, and is rotated in virtue of the magnetic fields generated by said adjacent two coil portions at the inner peripheries thereof, and
   said hollow disk-shaped rotor is disposed so as to be interposed between said adjacent two coil portions, and is rotated in virtue of the magnetic field generated by said adjacent two coil portions at lateral sides thereof in the direction of said rotational axis.

5. A stepping motor according to claim 1, wherein a number of coil portions in said at least three cylindrical coil portions is one more than a number of rotors in said plurality of hollow rotors.

6. A lens device comprising a stepping motor for driving at least one of a movable lens and a light-amount variable member, which changes a size of an aperture for opening an optical path of said movable lens, said stepping motor including:
   a plurality of hollow rotors on which magnetic substances having opposite polarities are alternately arranged in a circumferential direction, said rotors being disposed so as to make rotational axes thereof coincide with each other, and at least one of said movable lens and said light-amount variable member being driven upon rotation of said rotor; and
   a fixed barrel for rotating said rotors, said fixed barrel including at least three cylindrical coil portions for alternately generating magnetic fields having opposite polarities in the circumferential direction in accordance with energization of said coil portions, wherein said rotors and said coil portions are disposed in a direction of said rotational axis, and in said fixed barrel, the coil portion interposed between the other two coil portions is used for rotating said rotors in cooperation with the adjacent coil portions.

7. A lens device according to claim 6, further comprising:
   a movable barrel for holding said movable lens, said movable barrel being disposed at the inside of at least one of said rotors; and
   a helicoid mechanism for connecting an inner surface of said rotor and an outer surface of said movable barrel, said movable barrel being moved upon rotation of said rotor in a direction of said rotational axis by means of said helicoid mechanism to drive said movable lens.

8. A lens device according to claim 6, wherein said light-amount variable member is disposed at the inside of at least one of said rotors and has a drive member to be revolved for changing the size of said aperture, an inner surface of said rotor and said drive member being connected, and said drive member being revolved upon rotation of said rotor to drive said light-amount variable member.

9. A lens device according to claim 6, wherein a number of coil portions in said at least three cylindrical coil portions is one more than a number of rotors in said plurality of hollow rotors.

10. An imaging device comprising a lens device, which includes a stepping motor for driving at least one of a movable lens and a light-amount variable member, and a solid-state image sensor disposed behind said lens device, said light-amount variable member changing a size of an aperture for opening an optical path of said movable lens, said stepping motor comprising:
   a plurality of hollow rotors on which magnetic substances having opposite polarities are alternately arranged in a circumferential direction, said rotors being disposed so as to make rotational axes thereof coincide with each other, and at least one of said movable lens and said light-amount variable member being driven upon rotation of said rotor; and
   a fixed barrel for rotating said rotors, said fixed barrel including at least three cylindrical coil portions for alternately generating magnetic fields having opposite polarities in the circumferential direction in accordance with energization of said coil portions,
   wherein said rotors and said coil portions are disposed in a direction of said rotational axis, and in said fixed barrel, the coil portion interposed between the other two coil portions is used for rotating said rotors in cooperation with the adjacent coil portions.

11. An imaging device according to claim 10, wherein said solid-state image sensor is a CCD for receiving light having passed through at least one of said movable lens and said light-amount variable member.

12. An imaging device according to claim 10, wherein a number of coil portions in said at least three cylindrical coil portions is one more than a number of rotors in said plurality of hollow rotors.

13. A lens device comprising a stepping motor for driving a first movable lens and a second movable lens, said stepping motor including:
- a fixed barrel for containing said first and second movable lenses, said fixed barrel including cylindrical first, second and third coil portions alternately generating magnetic fields having opposite polarities in a circumferential direction in accordance with energization of said coil portions;
- a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof; and
- a cylindrical second rotor disposed inside said second and third coil portions, said second rotor, on a circumference of which magnetic substances having opposite polarities are alternately arranged, being rotated in virtue of the magnetic fields generated by said second and third coil portions at the inner peripheries thereof,
wherein said lens device further comprises:
- a first movable barrel disposed inside said first rotor to hold said first movable lens;
- a first helicoid mechanism for connecting said first rotor and said first movable barrel, said first movable barrel being moved in an axial direction thereof by said first helicoid mechanism upon rotation of said first rotor;
- a second movable barrel disposed inside said second rotor to hold said second movable lens; and
- a second helicoid mechanism for connecting said second rotor and said second movable barrel, said second movable barrel being moved in an axial direction thereof by said second helicoid mechanism upon rotation of said second rotor.

14. An imaging device comprising a lens device, which includes a stepping motor for driving a first movable lens and a second movable lens, and a solid-state image sensor disposed behind said lens device, said stepping motor comprising:
- a fixed barrel for containing said first and second movable lenses, said fixed barrel including cylindrical first, second and third coil portions alternately generating magnetic fields having opposite polarities in a circumferential direction in accordance with energization of said coil portions;
- a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof; and
- a cylindrical second rotor disposed inside said second and third coil portions, said second rotor, on a circumference of which magnetic substances having opposite polarities are alternately arranged, being rotated in virtue of the magnetic fields generated by said second and third coil portions at the inner peripheries thereof.

15. An imaging device according to claim 14, wherein said lens device further includes:
- a first movable barrel disposed inside said first rotor to hold said first movable lens;
- a first helicoid mechanism for connecting said first rotor and said first movable barrel, said first movable barrel being moved in an axial direction thereof by said first helicoid mechanism upon rotation of said first rotor;
- a second movable barrel disposed inside said second rotor to hold said second movable lens; and
- a second helicoid mechanism for connecting said second rotor and said second movable barrel, said second movable barrel being moved in an axial direction thereof by said second helicoid mechanism upon rotation of said second rotor.

16. An imaging device according to claim 15, wherein said solid-state image sensor is a CCD and receives the light having passed through said first and second movable lenses.

17. A lens device comprising a stepping motor for driving a movable lens and a light-amount variable member, which changes a size of an aperture for opening an optical path of said movable lens, said stepping motor including:
- a fixed barrel for containing said movable lens and said light-amount variable member, said fixed barrel including cylindrical first, second and third coil portions alternately generating magnetic fields having opposite polarities in a circumferential direction in accordance with energization of said coil portions;
- a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof; and
- a hollow disk-shaped second rotor disposed so as to be interposed between said second and third coil portions, said second rotor, on a surface of which magnetic substances having opposite polarities are alternately arranged, being rotated in virtue of the magnetic fields generated by said second and third coil portions at lateral sides thereof in its rotational axis direction,
wherein said lens device further comprises:
- a movable barrel disposed inside said first rotor to hold said movable lens;
- a helicoid mechanism for connecting said first rotor and said movable barrel, said movable barrel being moved in an axial direction thereof by said helicoid mechanism upon rotation of said first rotor; and
- a drive member attached to said light-amount variable member to change the size of said aperture, said light-amount variable member being disposed inside said second rotor and said drive member being connected to an inner surface of said second rotor.

18. An imaging device comprising a lens device, which includes a stepping motor for driving a movable lens and a light-amount variable member, and a solid-state image sensor disposed behind said lens device, said light-amount variable member changing a size of an aperture for opening an optical path of said movable lens, said stepping motor comprising:
- a fixed barrel for containing said movable lens and said light-amount variable member, said fixed barrel including cylindrical first, second and third coil portions alternately generating magnetic fields having opposite polarities in a circumferential direction in accordance with energization of said coil portions;

a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof and a hollow disk-shaped second rotor disposed so as to be interposed between said second and third coil portions, said second rotor, on a surface of which magnetic substances having opposite polarities are alternately arranged, being rotated in virtue of the magnetic fields generated by said second and third coil portions at lateral sides thereof in its rotational axis direction.

19. An imaging device according to claim 15, wherein said lens device further includes:

a movable barrel disposed inside said first rotor to hold said movable lens;

a helicoid mechanism for connecting said first rotor and said movable barrel, said movable barrel being moved in an axial direction thereof by said helicoid mechanism upon rotation of said first rotor; and a drive member attached to said light-amount variable member to change the size of said aperture, said light-amount variable member being disposed inside said second rotor and said drive member being connected to an inner surface of said second rotor.

20. An imaging device according to claim 19, wherein said solid-state image sensor is a CCD and receives the light having passed through said movable lens and said light-amount variable member.

21. A lens device comprising a stepping motor for driving a first movable lens, a second movable lens, a third movable lens and a light-amount variable member, which changes a size of an aperture for opening an optical path of said first, second and third movable lenses, said stepping motor comprising:

a fixed barrel for containing said first, second and third movable lenses and said light-amount variable member, said fixed barrel including cylindrical first, second, third, fourth and fifth coil portions alternately generating magnetic fields having opposite polarities in a circumferential direction in accordance with energization of said coil portions;

a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof;

a cylindrical second rotor disposed inside said second and third coil portions, said second rotor, on a circumference of which magnetic substances having opposite polarities are alternately arranged, being rotated in virtue of the magnetic fields generated by said second and third coil portions at the inner peripheries thereof;

hollow disk-shaped third rotor disposed so as to be interposed between said third and a fourth coil portions, said third rotor, on a surface of which magnetic substances having opposite polarities are alternately arranged, being rotated in virtue of the magnetic fields generated by said third and fourth coil portions at lateral sides thereof in its rotational axis direction; and a cylindrical fourth rotor disposed inside said fourth and fifth coil portions, said fourth rotor, on a circumference of which magnetic substances having opposite polarities are alternately arranged, being rotated in virtue of the magnetic fields generated by said fourth and fifth coil portions at the inner peripheries thereof, wherein said lens device further comprises:

a first movable barrel disposed inside said first rotor to hold said first movable lens;

a first helicoid mechanism for connecting said first rotor and said first movable barrel, said first movable barrel being moved in an axial direction thereof by said first helicoid mechanism upon rotation of said first rotor;

a second movable barrel disposed inside said second rotor to hold said second movable lens;

a second helicoid mechanism for connecting said second rotor and said second movable barrel, said second movable barrel being moved in an axial direction thereof by said second helicoid mechanism upon rotation of said second rotor;

a drive member attached to said light-amount variable member to change the size of said aperture, said light-amount variable member being disposed inside said third rotor and said drive member being connected to an inner surface of said third rotor;

a third movable barrel disposed inside said third rotor to hold said third movable lens; and a third helicoid mechanism for connecting said third rotor and said third movable barrel, said third movable barrel being moved in an axial direction thereof by said third helicoid mechanism upon rotation of said third rotor.

22. An imaging device comprising a lens device, which includes a stepping motor for driving a first movable lens, a second movable lens, a third movable lens and a light-amount variable member, and a solid-state image sensor disposed behind said lens device, said light-amount variable member changing a size of an aperture for opening an optical path of said first, second and third movable lenses, said stepping motor comprising:

a fixed barrel for containing said first, second and third movable lenses and said light- amount variable member, said fixed barrel including cylindrical first, second, third, fourth and fifth coil portions alternately generating magnetic fields having opposite polarities in a circumferential direction in accordance with energization of said coil portions;

a cylindrical first rotor disposed inside said first and second coil portions, said first rotor, on a circumference of which magnetic substances having opposite polarities are alternately arranged, being rotated in virtue of the magnetic fields generated by said first and second coil portions at the inner peripheries thereof;

a cylindrical second rotor disposed inside said second and third coil portions, said second rotor, on a circumference of which magnetic substances having opposite polarities are alternately arranged, being rotated in virtue of the magnetic fields generated by said second and third coil portions at the inner peripheries thereof;

a hollow disk-shaped third rotor disposed so as to be interposed between said third and fourth coil portions, said third rotor, on a surface of which magnetic substances having opposite polarities are alternately arranged, being rotated in virtue of the magnetic fields generated by said third and fourth coil portions at lateral sides thereof in its rotational axis direction; and a cylindrical fourth rotor disposed inside said fourth and fifth coil portions, said fourth rotor, on a circumference of which magnetic substances having opposite polarities are alternately arranged, being rotated in virtue of the magnetic fields generated by said fourth and fifth coil portions at the inner peripheries thereof.

23. An imaging device according to claim 22, wherein said lens device further includes:
- a first movable barrel disposed inside said first rotor to hold said first movable lens;
- a first helicoid mechanism for connecting said first rotor and said first movable barrel, said first movable barrel being moved in an axial direction thereof by said first helicoid mechanism upon rotation of said first rotor;
- a second movable barrel disposed inside said second rotor to hold said second movable lens;
- a second helicoid mechanism for connecting said second rotor and said second movable barrel, said second movable barrel being moved in an axial direction thereof by said second helicoid mechanism upon rotation of said second rotor;
- a drive member attached to said light-amount variable member to change the size of said aperture, said light-amount variable member being disposed inside said third rotor and said drive member being connected to an inner surface of said third rotor;
- a third movable barrel disposed inside said third rotor to hold said third movable lens; and
- a third helicoid mechanism for connecting said third rotor and said third movable barrel, said third movable barrel being moved in an axial direction thereof by said third helicoid mechanism upon rotation of said third rotor.

24. An imaging device according to claim 23, wherein said solid-state image sensor is a CCD and receives the light having passed through said first, second and third movable lenses and said light-amount variable member.

* * * * *